US011483807B2

(12) United States Patent
Islam et al.

(10) Patent No.: US 11,483,807 B2
(45) Date of Patent: Oct. 25, 2022

(54) BEAM TRAINING REQUEST TECHNIQUES IN BEAMFORMED WIRELESS COMMUNICATIONS

(71) Applicant: QUALCOMM Incorporated, San Diego, CA (US)

(72) Inventors: Muhammad Nazmul Islam, Littleton, MA (US); Junyi Li, Chester, NJ (US); Juergen Cezanne, Ocean Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 188 days.

(21) Appl. No.: 16/515,998

(22) Filed: Jul. 18, 2019

(65) Prior Publication Data

US 2020/0260432 A1 Aug. 13, 2020

Related U.S. Application Data

(60) Provisional application No. 62/805,053, filed on Feb. 13, 2019.

(51) Int. Cl.
*H04W 72/04* (2009.01)
*H04W 72/08* (2009.01)
(Continued)

(52) U.S. Cl.
CPC ....... *H04W 72/0413* (2013.01); *H04L 1/1893* (2013.01); *H04L 5/0051* (2013.01);
(Continued)

(58) Field of Classification Search
CPC combination set(s) only.
See application file for complete search history.

(56) References Cited

U.S. PATENT DOCUMENTS

2017/0359826 A1\* 12/2017 Islam .................. H04W 72/042
2018/0091262 A1\* 3/2018 Jung ..................... H04L 1/1887
(Continued)

FOREIGN PATENT DOCUMENTS

WO  WO-2017180187 A1  10/2017

OTHER PUBLICATIONS

International Search Report and Written Opinion—PCT/US2020/012956—ISA/EPO—dated Mar. 16, 2020.
(Continued)

*Primary Examiner* — Yee F Lam
(74) *Attorney, Agent, or Firm* — Holland & Hart LLP

(57) ABSTRACT

Methods, systems, and devices for wireless communications are described for initiating beam training in systems that use beamformed wireless communications. A user equipment (UE) and a base station may establish communications using a first beam, and the UE may determine that a signal quality of the first beam is lower than a threshold value and that a beam training procedure is to be initiated. The UE may transmit a beam training request to initiate the beam training procedure, which may be transmitted as part of a bit sequence that is used to transmit uplink control information to the base station, such as with acknowledgment/negative-acknowledgment feedback, a scheduling request, or other uplink control information.

13 Claims, 18 Drawing Sheets

(51) Int. Cl.
*H04L 1/18* (2006.01)
*H04L 5/00* (2006.01)

(52) U.S. Cl.
CPC ......... *H04L 5/0055* (2013.01); *H04W 72/046* (2013.01); *H04W 72/0446* (2013.01); *H04W 72/082* (2013.01)

(56) References Cited

U.S. PATENT DOCUMENTS

| | | | |
|---|---|---|---|
| 2018/0131426 A1* | 5/2018 | Lee | H04B 7/0695 |
| 2018/0139014 A1* | 5/2018 | Xiong | H04L 5/0091 |
| 2018/0302889 A1 | 10/2018 | Guo et al. | |
| 2019/0014568 A1* | 1/2019 | Nilsson | H04W 24/08 |
| 2019/0081688 A1* | 3/2019 | Deenoo | H04B 7/088 |
| 2019/0349960 A1* | 11/2019 | Li | H04W 72/1242 |
| 2020/0107310 A1* | 4/2020 | Wang | H04W 72/046 |
| 2020/0274666 A1* | 8/2020 | Zhang | H04L 5/0053 |

OTHER PUBLICATIONS

VIVO: "Beam Failure Recovery Procedure", 3GPP Draft, R1-1710400, Beam Failure Recovery Procedure, 3rd Generation Partnership Project (3GPP), Mobile Competence Centre; 650, Route Des Lucioles, F-06921, Sophia-Antipolis Cedex, France, vol. RAN WG1, No. Qingdao, Jun. 27, 2017-Jun. 30, 2017, Jun. 26, 2017 (Jun. 26, 2017), XP051299612, 5 pages, Retrieved from the Internet: URL: http://www.3gpp.org/ftp/Meetings_3GPP_SYNC/RAN1/Docs/. [retrieved on Jun. 26, 2017], pp. 3,4; figure 1.

* cited by examiner

BEAM TRAINING REQUEST TECHNIQUES IN BEAMFORMED WIRELESS COMMUNICATIONS

CROSS REFERENCE

The present Application for Patent claims the benefit of U.S. Provisional Patent Application No. 62/805,053 by Islam et al., entitled "BEAM TRAINING REQUEST TECHNIQUES IN BEAMFORMED WIRELESS COMMUNICATIONS," filed Feb. 13, 2019, assigned to the assignee hereof, and expressly incorporated by reference in its entirety herein.

FIELD OF DISCLOSURE

The following relates generally to wireless communications, and more specifically to beam training request techniques in beamformed wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, wireless devices (e.g., base stations, UEs, etc.) may use beamformed or precoded signals for transmission and/or reception of wireless communications. For example, a base station may utilize beamformed or precoded transmissions to provide directional transmissions that may mitigate path losses that may be experienced by non-beamformed or non-precoded transmissions which may have a relatively wide beam or omnidirectional transmission pattern. In some cases, a UE may monitor one or more beams as part of a beam sweeping or beam training procedure to identify a particular beam or beams that are suitable for beamformed communications between the UE and the base station. In some cases, the UE may obtain beamforming parameters for communicating with a base station from information provided via the beam sweeping procedure, and communications may be established using identified beamforming parameters. In cases where an established beam becomes less suitable for communications, the UE and the base station may perform a subsequent beam sweeping or beam training procedure to establish a more suitable beam or beams for communications. Efficient techniques for identifying beams and associated information for communications may help enhance reliability and efficiency of a network utilizing beamforming.

SUMMARY

The described techniques relate to improved methods, systems, devices, and apparatuses that support beam training request techniques in beamformed wireless communications. Described techniques of various aspects provide for identification, by a user equipment (UE), that a particular beam used for communications has a signal quality that is lower than a threshold value and that a beam training procedure is to be initiated. The UE may transmit a beam training request to initiate the beam training procedure, which may be transmitted as part of a bit sequence that is used to transmit other uplink control information to the base station. In some cases, the UE may transmit feedback information to the base station that indicates whether one or more transmissions have been successfully received at the UE (e.g., hybrid acknowledgment repeat request (HARD) feedback), and may transmit a beam training request in a same bit sequence that is used to provide the feedback information. In other cases, the UE may transmit a scheduling request or a reference signal (e.g., a demodulation reference signal) to the base station, and may transmit the beam training request in the bit sequence that is used to transmit the scheduling request or reference signal.

In some cases, a beam training request bit sequence may be appended to a bit sequence of the uplink control information. In some cases, a scrambling sequence used to scramble the uplink control information (e.g., a scrambling sequence used to scramble a reference signal transmission) may be selected to indicate a beam training request to the base station. The base station and the UE, based on the beam training request, may initiate a beam training procedure (e.g., a beam sweep by the base station of multiple transmission beams that may be measured by the UE to identify one or more beams that have higher quality) and identify one or more new beams to be used for communications.

A method of wireless communication at a UE is described. The method may include receiving a downlink transmission from a base station in a first transmission beam, determining, based on a signal quality of the first transmission beam being below a threshold value, to transmit a beam training request to the base station to identify a second transmission beam for communications between the UE and the base station, identifying a combined uplink control information sequence that combines the beam training request with uplink control information to be transmitted to the base station in uplink resources associated with the uplink control information, and transmitting the combined uplink control information sequence to the base station using the uplink resources.

An apparatus for wireless communication at a UE is described. The apparatus may include a processor, memory in electronic communication with the processor, and instructions stored in the memory. The instructions may be executable by the processor to cause the apparatus to receive a downlink transmission from a base station in a first transmission beam, determine, based on a signal quality of the first transmission beam being below a threshold value, to transmit a beam training request to the base station to identify a second transmission beam for communications between the UE and the base station, identify a combined uplink control information sequence that combines the beam training request with uplink control information to be transmitted to the base station in uplink resources associated with the uplink control information, and transmit the combined uplink control information sequence to the base station using the uplink resources.

Another apparatus for wireless communication at a UE is described. The apparatus may include means for receiving a downlink transmission from a base station in a first transmission beam, determining, based on a signal quality of the first transmission beam being below a threshold value, to transmit a beam training request to the base station to identify a second transmission beam for communications between the UE and the base station, identifying a combined uplink control information sequence that combines the beam training request with uplink control information to be transmitted to the base station in uplink resources associated with the uplink control information, and transmitting the combined uplink control information sequence to the base station using the uplink resources.

A non-transitory computer-readable medium storing code for wireless communication at a UE is described. The code may include instructions executable by a processor to receive a downlink transmission from a base station in a first transmission beam, determine, based on a signal quality of the first transmission beam being below a threshold value, to transmit a beam training request to the base station to identify a second transmission beam for communications between the UE and the base station, identify a combined uplink control information sequence that combines the beam training request with uplink control information to be transmitted to the base station in uplink resources associated with the uplink control information, and transmit the combined uplink control information sequence to the base station using the uplink resources.

Some examples of the method, apparatuses, and non-transitory computer-readable medium described herein may further include operations, features, means, or instructions for encoding a control channel sequence and a beam training request sequence into the combined uplink control information sequence. In some examples of the method, apparatuses, and non-transitory computer-readable medium described herein, the uplink control information includes one or more of HARQ acknowledgment/negative-acknowledgment (ACK/NACK) information, a scheduling request (SR), a reference signal transmission, a reference signal quality indication, a reference signal index indication, or any combinations thereof. In some examples of the method, apparatuses, and non-transitory computer-readable medium described herein, the reference signal quality indication provides one or more of reference signal received power (RSRP), reference signal received quality (RSRQ), SNR, signal-to-interference-and-noise ratio (SINR), or any combinations thereof. In some examples of the method, apparatuses, and non-transitory computer-readable medium described herein, the reference signal includes one or more of a synchronization signal, a demodulation reference signal (DMRS), channel state information reference signal (CSI-RS), or any combinations thereof.

In some examples of the method, apparatuses, and non-transitory computer-readable medium described herein, the transmitting may include operations, features, means, or instructions for transmitting the combined uplink control information sequence through a physical uplink control channel or a physical uplink shared channel. In some examples of the method, apparatuses, and non-transitory computer-readable medium described herein, the uplink control information may be a HARQ acknowledgment/ negative-acknowledgment (ACK/NACK) transmission and the combined uplink control information sequence may be selected from a set of available sequences for the HARQ ACK/NACK transmission, where the set of available sequences include one or more of an ACK-only sequence, a NACK-only sequence, a beam training request only sequence, or a sequence that indicates a combination of one or more of ACK, NACK, or beam training request information. In some examples of the method, apparatuses, and non-transitory computer-readable medium described herein, the combined uplink control information sequence includes a first portion that includes ACK/NACK bits and a second portion that includes beam training request bits.

Some examples of the method, apparatuses, and non-transitory computer-readable medium described herein may further include operations, features, means, or instructions for receiving, from the base station, configuration information for the combined uplink control information sequence in one or more of a physical downlink control channel (PDCCH), a medium access control (MAC) control element (MAC-CE), radio resource control (RRC) signaling, system information (SI) signaling, or any combinations thereof.

Some examples of the method, apparatuses, and non-transitory computer-readable medium described herein may further include operations, features, means, or instructions for receiving a beam training indication from the base station that initiates a beam training procedure, monitoring one or more transmission beams from the base station, including the second transmission beam, transmitting measurement information associated with the monitored one or more transmission beams to the base station, and receiving a beam switch command from the base station to switch from the first transmission beam to the second transmission beam responsive to the measurement information.

A method of wireless communication at a base station is described. The method may include transmitting one or more downlink transmissions to a UE in a first transmission beam, receiving from the UE, in allocated resources for an uplink control information transmission, a combined uplink control information sequence that includes a beam training request and uplink control information associated with the one or more downlink transmissions, and initiating, responsive to receiving the combined uplink control information sequence, a beam training sequence to identify a second beam for communications between the base station and the UE.

An apparatus for wireless communication at a base station is described. The apparatus may include a processor, memory in electronic communication with the processor, and instructions stored in the memory. The instructions may be executable by the processor to cause the apparatus to transmit one or more downlink transmissions to a UE in a first transmission beam, receive from the UE, in allocated resources for an uplink control information transmission, a combined uplink control information sequence that includes a beam training request and uplink control information associated with the one or more downlink transmissions, and initiate, responsive to receiving the combined uplink control information sequence, a beam training sequence to identify a second beam for communications between the base station and the UE.

Another apparatus for wireless communication at a base station is described. The apparatus may include means for transmitting one or more downlink transmissions to a UE in a first transmission beam, receiving from the UE, in allocated resources for an uplink control information transmission, a combined uplink control information sequence that includes a beam training request and uplink control information associated with the one or more downlink transmissions, and initiating, responsive to receiving the combined uplink control information sequence, a beam training sequence to identify a second beam for communications between the base station and the UE.

A non-transitory computer-readable medium storing code for wireless communication at a base station is described. The code may include instructions executable by a processor to transmit one or more downlink transmissions to a UE in a first transmission beam, receive from the UE, in allocated resources for an uplink control information transmission, a combined uplink control information sequence that includes a beam training request and uplink control information associated with the one or more downlink transmissions, and initiate, responsive to receiving the combined uplink control information sequence, a beam training sequence to identify a second beam for communications between the base station and the UE.

In some examples of the method, apparatuses, and non-transitory computer-readable medium described herein, the beam training request indicates that a signal quality of the first transmission beam at the UE is below a threshold value. In some examples of the method, apparatuses, and non-transitory computer-readable medium described herein, the second beam is a second downlink transmission beam. In some examples of the method, apparatuses, and non-transitory computer-readable medium described herein, the second beam is a second downlink reception beam, and where the second downlink reception beam is different from a reception beam used that the UE to receive communications over the first transmission beam.

In some examples of the method, apparatuses, and non-transitory computer-readable medium described herein, the combined uplink control information sequence includes a control channel sequence and a beam training request sequence that may be encoded into the combined uplink control information sequence. In some examples of the method, apparatuses, and non-transitory computer-readable medium described herein, the uplink control information includes one or more of HARQ acknowledgment/negative-acknowledgment (ACK/NACK) information, a scheduling request (SR), a reference signal transmission, a reference signal quality indication, a reference signal index indication, or any combinations thereof. In some examples of the method, apparatuses, and non-transitory computer-readable medium described herein, the reference signal quality indication provides one or more of reference signal received power (RSRP), reference signal received quality (RSRQ), SNR, signal-to-interference-and-noise ratio (SINR), or any combinations thereof. In some examples of the method, apparatuses, and non-transitory computer-readable medium described herein, the reference signal includes one or more of a synchronization signal, a demodulation reference signal (DMRS), channel state information reference signal (CSI-RS), or any combinations thereof.

In some examples of the method, apparatuses, and non-transitory computer-readable medium described herein, the receiving may include operations, features, means, or instructions for receiving the combined uplink control information sequence through a physical uplink control channel or a physical uplink shared channel. In some examples of the method, apparatuses, and non-transitory computer-readable medium described herein, the uplink control information may be a HARQ acknowledgment/negative-acknowledgment (ACK/NACK) transmission and the combined uplink control information sequence may be selected from a set of available sequences for the HARQ ACK/NACK transmission, where the set of available sequence include one or more of an ACK-only sequence, a NACK-only sequence, a beam training request only sequence, or a sequence that indicates a combination of one or more of ACK, NACK, or beam training request information. In some examples of the method, apparatuses, and non-transitory computer-readable medium described herein, the combined uplink control information sequence includes a first portion that includes ACK/NACK bits and a second portion that includes beam training request bits.

Some examples of the method, apparatuses, and non-transitory computer-readable medium described herein may further include operations, features, means, or instructions for transmitting configuration information to the UE in one or more of a PDCCH, a MAC-CE, RRC signaling, system information (SI) signaling, or any combinations thereof, where the configuration information enables the UE to transmit the combined uplink control information sequence.

Some examples of the method, apparatuses, and non-transitory computer-readable medium described herein may further include operations, features, means, or instructions for transmitting a beam training indication to the UE to initiate a beam training procedure, transmitting a set of transmission beams, including the second transmission beam, for measurement by the UE, receiving, from the UE, measurement information associated with the set of transmission beams, determining to switch the UE from the first transmission beam to the second transmission beam based on the measurement information, and transmitting a beam switch command to the UE to switch from the first transmission beam to the second transmission beam.

DETAILED DESCRIPTION

Figure 1:
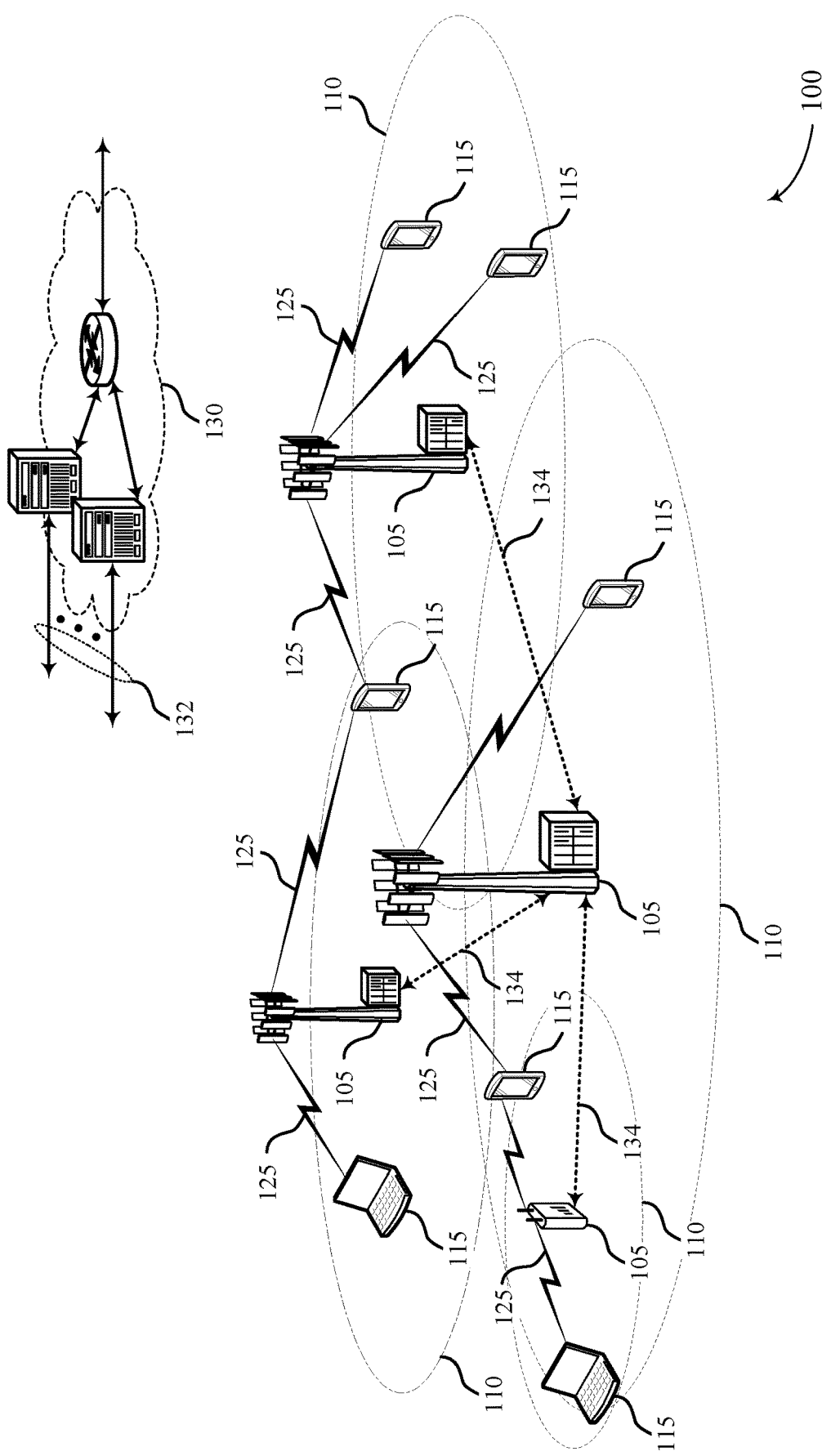
FIG. 1 illustrates an example of a system for wireless communications that supports beam training request techniques in beamformed wireless communications in accordance with aspects of the present disclosure.

Various aspects of the present disclosure relate to methods, systems, devices, and apparatuses that support efficient beam training requests in beamformed communications between a user equipment (UE) and a base station. In some cases, a base station and a UE may establish a connection using one or more beamformed transmission beams. The UE and base station may periodically perform beam refinement procedures or beam training procedures and may update the transmission beams used for communications based on such procedures. For example, UE movement relative to the base station may result in one or more different transmission beams being selected for subsequent communications. In some cases, the UE may identify that signal quality of a transmission beam being used for communications with the base station has degraded and may initiate a beam training procedure through transmission of a beam training request. In some cases, the UE may transmit the beam training request with uplink control information using previously configured uplink resources of the uplink control information.

In some cases, the uplink control information may be feedback information such as hybrid acknowledgment repeat request (HARQ) acknowledgment/negative-acknowledgment (ACK/NACK) feedback that may indicate whether downlink transmissions from the base station have been successfully received at the UE. In some cases, the HARQ ACK/NACK feedback may trigger a retransmission of one or more downlink transmissions. However, if a beam training procedure has not been initiated subsequent to the retransmission of the downlink transmissions, such retransmissions may use a transmission beam that may no longer be reliable, such as due to movement between the UE and base station. In some cases, the UE may identify that a signal associated with the downlink transmission (e.g., a demodulation reference signal (DMRS)) has a signal quality that is below a threshold value, and may transmit a beam training request based on the signal quality being below the threshold value.

In some cases, the beam training request may be transmitted in a same bit sequence that is used to transmit the HARQ ACK/NACK feedback using uplink resources that are allocated for the HARQ feedback. Additionally or alternatively, the beam training request may be transmitted with one or more other uplink control information transmissions, such as a scheduling request, a reference signal transmission (e.g., a synchronization signal, a DMRS, a channel state information reference signal (CSI-RS), etc.), a reference signal quality indication, a reference signal index indication, or any combinations thereof.

Such techniques may allow for transmission beams to be updated more quickly when an existing transmission beam quality has degraded, and thus provide more efficient and reliable communications. Such techniques may be employed, in some examples, in system that use beamforming with relatively narrow beams that necessitate relatively fast beam switching in cases where a UE is moving between different beams. For example, high-band millimeter wave (mmWave) communications that use the 60-100 gigahertz (GHz) range of frequencies (e.g., the "60 GHz band", which refers to 57-64 & 64-71 GHz bands) may use relatively narrow beams as compared to lower-band mmWave frequencies (e.g., mmWave frequencies in the 30 GHz band), and a UE that is moving within a base station's coverage area may benefit from relatively frequent changes in beams used for communications. Accordingly, techniques such as discussed herein may enhance beam switching procedures for such situations through faster and more efficient beam switching. Further, in such cases such frequency bands may be unlicensed or shared bands, and thus different transmitters may share the frequencies in accordance with established procedures that provide for fair access to the spectrum (e.g., using listen-before-talk (LBT) procedures).

Aspects of the disclosure are initially described in the context of a wireless communications system. Aspects of the disclosure are further illustrated by and described with reference to apparatus diagrams, system diagrams, and flowcharts that relate to beam training request techniques in beamformed wireless communications.

FIG. 1 illustrates an example of a wireless communications system 100 that supports beam training request techniques in beamformed wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may include of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

In some cases, a UE 115 and a base station 105 may communicate using beamformed transmission beams, and the UE 115 may identify that a particular beam used for communications has a signal quality that is lower than a threshold value and that a beam training procedure is to be initiated. The UE 115 in such cases may transmit a beam training request to initiate the beam training procedure, which may be transmitted as part of a bit sequence that is used to transmit other uplink control information to the base station 105. In some cases, the UE 115 may transmit feedback information to the base station 105 that indicates whether one or more transmissions have been successfully received at the UE 115 (e.g., HARQ feedback), and may transmit a beam training request in a same bit sequence that is used to provide the feedback information. In other cases, the UE 115 may transmit a scheduling request or a reference signal (e.g., a DMRS) to the base station 105, and may transmit the beam training request in the bit sequence that is used to transmit the scheduling request or reference signal.

In some cases, a beam training request bit sequence may be appended to a bit sequence of the uplink control information. In some cases, a scrambling sequence used to scramble the uplink control information (e.g., a scrambling sequence used to scramble a reference signal transmission) may be selected to indicate a beam training request to the base station 105. The base station 105 and the UE 115, based on the beam training request, may initiate a beam training procedure (e.g., a beam sweep by the base station of multiple transmission beams that may be measured by the UE 115 to identify one or more beams that have higher quality) and identify one or more new beams to be used for communications.

Figure 2:
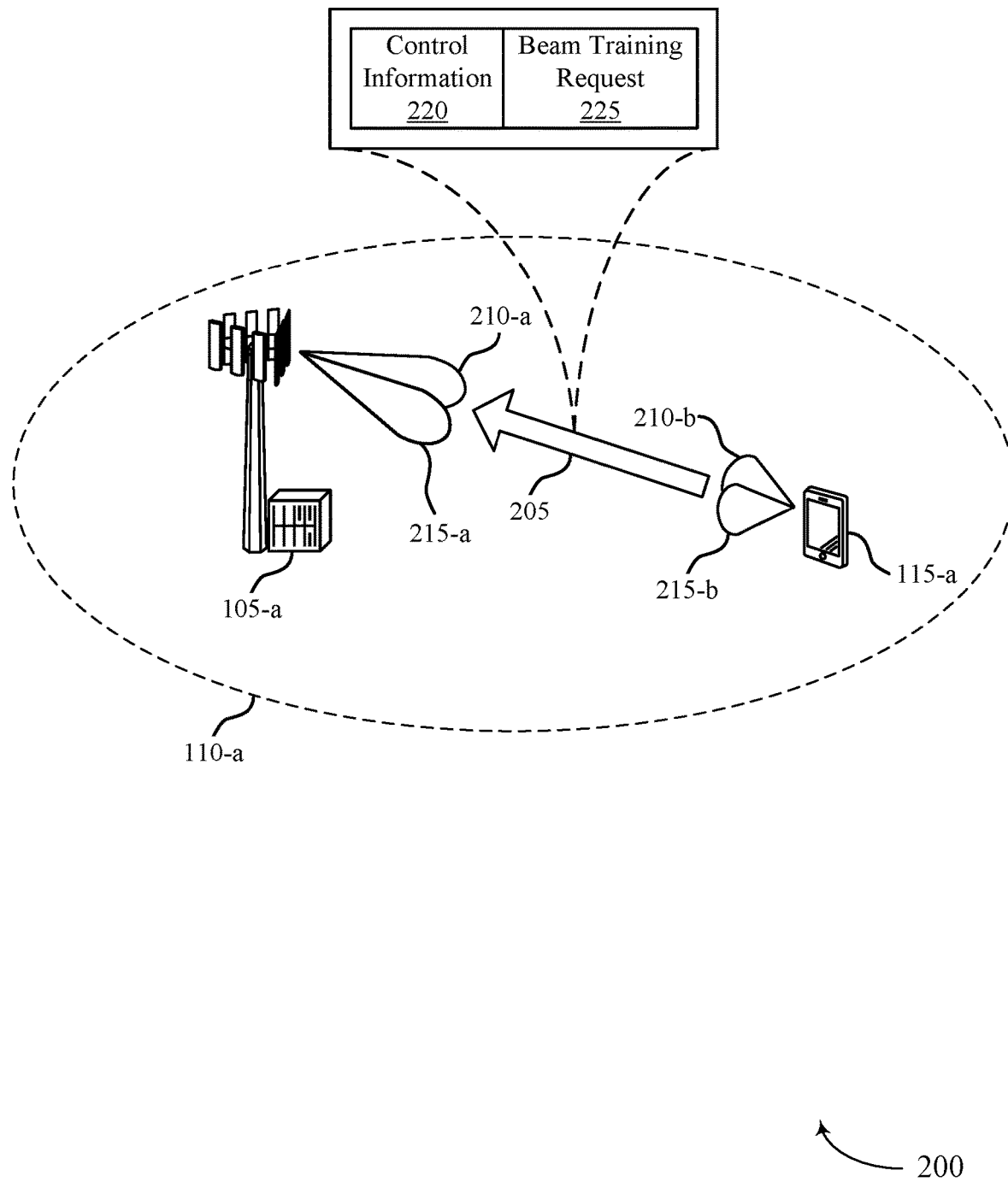
FIG. 2 illustrates an example of a wireless communications system that supports beam training request techniques in beamformed wireless communications in accordance with aspects of the present disclosure.

FIG. 2 illustrates an example of a wireless communications system 200 that supports beam training request techniques in beamformed wireless communications in accordance with aspects of the present disclosure. In some examples, wireless communications system 200 may implement aspects of wireless communications system 100. In the example of FIG. 2, wireless communications system 200 may include base station 105-a and UE 115-a, which may be examples of the corresponding devices described with respect to FIG. 1. Base station 105-a may provide network coverage for geographic coverage area 110-a. To support beamformed communications between base station 105-a and UE 115-a, UE 115-a may transmit a control information 220 and a beam training request 225 to base station 105-a on an uplink channel 205.

In some cases, base station 105-a and UE 115-a may establish communication via a first beam pair link that may include a first transmit beam 210-a and a first receive beam 210-b. In some cases, the UE 115-a and base station 105-a may use corresponding beamforming parameters associated with a particular transmission beam to configure wireless communications hardware for transmitting/receiving beamformed transmissions in which a beam pair link may have coupled transmission beams with corresponding beamforming parameters. The beamforming parameters may include a particular spatial domain filter for uplink or downlink communications that is associated with a particular transmission beam. In cases with coupled transmission beams, the beamforming parameters of an uplink beam may be determined based on one or more reference signals that are received on a selected downlink beam 210 which is quasi co-located (QCL) with the uplink beam. Two antenna ports are said to be QCL if properties of the channel over which a symbol on one antenna port is conveyed can be inferred from the channel over which a symbol on the other antenna port is conveyed.

In some cases, one or more beam pair links may be established through a beam sweep and beam refinement procedure in which the UE 115-a may measure one or more reference signals from the base station 105-a (e.g., channel state information reference signal (CSI-RS) transmissions) and provide measurement reports to the base station 105-a that are used to determine the beam pair links (BPL). Systems that employ transmission beams may use measurements related to multiple beams to identify a best, or most preferred beam to use in a BPL. For example, a first wireless device (e.g., base station 105-a) may perform a beam sweep (e.g., a P1 beam training procedure) in which consecutive beams having a relatively wide beam width are transmitted and may be measured at a second wireless device (e.g., UE 115-a) to identify a best beam (e.g., a beam with a highest RSRP) and provide an indication to the first wireless device of the preferred beam. In some cases, further beam refinements may be performed in which the first wireless device may transmit one or more reference signals (e.g., a CSI-RS in a P2 (for downlink beams) and/or P3 (for uplink beams) beam training procedure) in narrower beams to identify more focused beams for use in BPLs.

After establishment of one or more BPLs, the UE 115-a and base station 105-a may periodically perform beam refinement procedures (e.g., one or more of P1, P2, or P3 procedures) to help maintain communications using reliable transmission beams. Uplink beams from the UE 115-a to the base station 105-a may also be measured using similar techniques (e.g., through sounding reference signal (SRS) measurements at the base station 105-a of SRS transmissions from the UE 115-a). In some cases, UE 115-a may determine that a particular beam that is currently being used for communications is degrading to the point that communications over the beam may become unreliable. In such cases, the UE 115-a may transmit a beam training request to initiate a beam training procedure, which also may be referred to as a beam refinement procedure. In some deployments, the base station 105-a may schedule periodic uplink resources that may be used by the UE 115-a to transmit such a beam training request. However, such uplink resources may be scheduled relatively infrequently to reduce system overhead, and in cases where the UE 115-a determines that a beam training request is to be transmitted between such resources, various aspects of the present disclosure provide that a beam training request 225 may be transmitted by the UE 115-a with one or more other uplink control information transmissions 220 (e.g., in a HARQ ACK/NACK feedback transmission, a scheduling request, a reference signal transmission, or any combinations thereof).

In some cases, for example, the first transmit beam 210-a may be a downlink beam transmitted from the base station 105-a according to established beamforming parameters of the UE 115-a and the base station 105-a. The first receive beam 210-b may be a QCL spatial beam used as a receive beam at the UE 115-a. In some examples, the base station 105-a may transmit a downlink transmission via the first downlink beam 210-a, and the UE 115-a may attempt to decode the downlink transmission as received via the first receive beam 210-b. If the UE 115-a is unable to successfully decode the downlink transmission, feedback may be provided to the base station 105-a, such as through HARQ ACK/NACK feedback. Based on the feedback from the UE 115-a, the base station 105-a may initiate one or more retransmissions of the downlink transmission.

During such transmissions and retransmissions, the base station 105-a may not provision reference signals (e.g., CSI-RS) for beam training. Hence, the UE 115-a and base station 105-a network may continue using the same beam during the entire feedback transmission and retransmission process (e.g., for the entire HARQ transmission and retransmission process). In cases where the UE 115-a may be moving relative to the base station 105-a, the beam may get outdated during this process which may lead to further retransmissions. In some cases, to help prevent such degradation, the UE 115-a may estimate that the beam quality has worsened from a signal quality of received downlink transmissions (e.g., based on a DMRS of physical downlink shared channel (PDSCH) or by a reference signal received power (RSRP) of a synchronization signal block (SSB) that is QCLed with the DMRS of the PDSCH signal).

In cases where the beam quality falls below a predetermined threshold value (e.g., if a RSRP falls below a threshold value), the UE 115-a may transmit the beam training request 225 along with uplink control information 220 that includes feedback information (e.g., HARQ ACK/NACK information) such that the uplink control information 220 and the beam training request 225 may be transmitted in a same uplink transmission. Thus, the UE 115-a is able to use an automatically provisioned uplink resource to convey HARQ ACK/NACK feedback to also provide the beam training request 225. Upon receiving this combination of signals, the base station 105-a may transmit a reference signal for measurement at the UE 115-a as part of a new beam training procedure to establish a new beam pair link via second downlink beam 215-a and a second receive beam 215-b. In some cases, retransmissions using the new beam pair link may include PDSCH retransmissions with a different HARQ ID.

In other cases, one or more other types of uplink control information 220 transmissions may be used to also convey the beam training request 225. For example, the uplink control information may include an SR, a reference signal transmission, a reference signal quality indication, a reference signal index indication, or any combinations thereof. The reference signal quality indication may provide, in some cases, one or more of RSRP, reference signal received quality (RSRQ), signal-to-noise ratio (SNR), signal-to-interference-and-noise ratio (SINR), or any combinations thereof. The reference signals may include one or more of a synchronization signal, a DMRS, CSI-RS, or any combinations thereof.

In some cases, the UE 115-a may encode a control channel sequence and a beam training request sequence into a combined uplink control information sequence, and transmit the combined uplink control information sequence through a physical uplink control channel (PUCCH) or a physical uplink shared channel (PUSCH) transmission. In some cases, the base station 105-a may configure the UE 115-a to transmit combined uplink control 220 and beam training request 225 signals. For example, the base station 105-a may transmit configuration information for the combined uplink control information sequence in one or more of a physical downlink control channel (PDCCH), a MAC-CE, RRC signaling, system information (SI) signaling, a master information block, or any combinations thereof.

Figure 3:
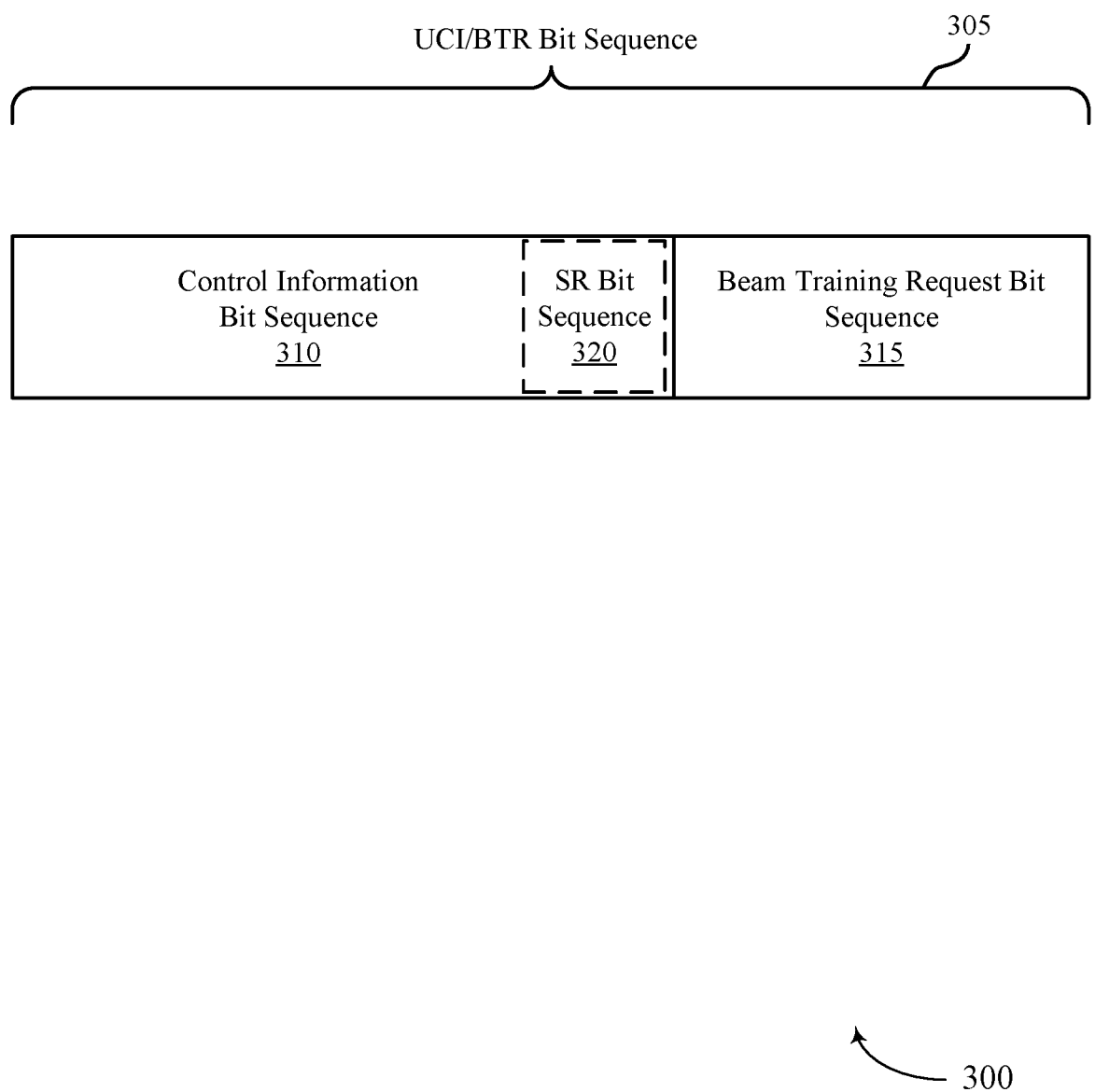
FIG. 3 illustrates an example of a combined control information and beam training request that supports beam training request techniques in beamformed wireless communications in accordance with aspects of the present disclosure.

FIG. 3 illustrates an example of a combined control information and beam training request 300 that supports beam training request techniques in beamformed wireless communications in accordance with aspects of the present disclosure. In some examples, combined control information and beam training request 300 may implement aspects of wireless communications system 100 or 200. In this example, an uplink control information and beam training request bit sequence 305 may be transmitted by a UE (e.g., a UE 115 of FIG. 1 or 2) to a base station (e.g., a base station 105 of FIG. 1 or 2).

In this example, the uplink control information and beam training request bit sequence 305 may include a control information bit sequence 310, and a beam training request bit sequence 315 may be appended thereto to form the uplink control information and beam training request bit sequence 305. In some cases, the combined uplink control information and beam training request bit sequence 305 may be encoded for transmission in uplink resources associated with an uplink control channel transmission. As indicated with respect to FIGS. 1 and 2, the uplink control information of various examples may include feedback information (e.g., HARQ ACK/NACK information), an SR, a reference signal transmission, a reference signal quality indication, a reference signal index indication, or any combinations thereof. The reference signal quality indication may provide, in some cases, one or more of RSRP, RSRQ, SNR, SINR, or any combinations thereof. The reference signals may include one or more of a synchronization signal, a DMRS, CSI-RS, or any combinations thereof.

In some cases, a UE 115-a may encode an optional SR bit sequence 320 with the control information bit sequence 310. For example, the control information bit sequence 310 may include a HARQ ACK/NACK bit sequence, and the SR bit sequence 320 may be appended thereto, prior to appending the beam training request bit sequence 315. The UE 115-a may then transmit the combined uplink control information sequence through a PUCCH or a PUSCH transmission. In some cases, the base station 105-a may configure the UE 115-a to transmit combined uplink control 220 and beam training request 225 signals. For example, the base station 105-a may transmit configuration information for the combined uplink control information sequence in one or more of a PDCCH, a MAC-CE, RRC signaling, SI signaling, a master information block, or any combinations thereof. The control information bit sequence 305 may be determined, in some cases, according to a codebook that may be configured for the uplink control information transmission (e.g., in accordance with control information reporting techniques described in 3GPP TS 38.213).

Figure 4:
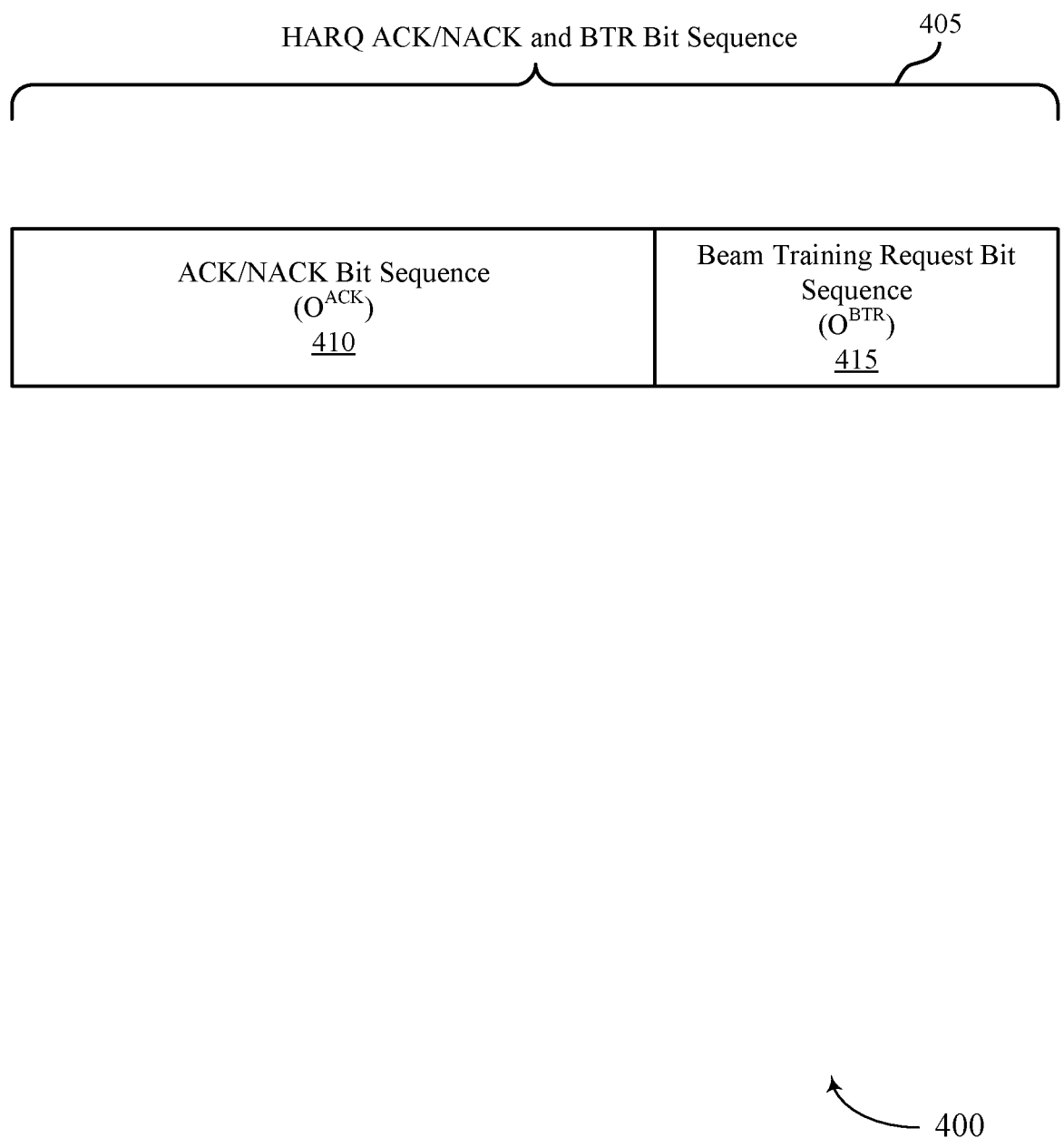
FIG. 4 illustrates an example of a HARQ ACK/NACK and beam training bit sequence that supports beam training request techniques in beamformed wireless communications in accordance with aspects of the present disclosure.

FIG. 4 illustrates an example of a HARQ ACK/NACK and beam training bit sequence 400 that supports beam training request techniques in beamformed wireless communications in accordance with aspects of the present disclosure. In some examples, HARQ ACK/NACK and beam training bit sequence 400 may implement aspects of wireless communications system 100 or 200. In this example, a HARQ ACK/NACK and beam training request bit sequence 405 may be transmitted by a UE (e.g., a UE 115 of FIG. 1 or 2) to a base station (e.g., a base station 105 of FIG. 1 or 2).

In this example, the HARQ ACK/NACK and beam training request bit sequence 405 may include an ACK/NACK bit sequence 410, and a beam training request bit sequence 415 that may be appended thereto to form the HARQ ACK/NACK and beam training request bit sequence 405. In some cases, the combined HARQ ACK/NACK and beam training request bit sequence 305 may be encoded for transmission in uplink resources associated with an uplink control channel transmission.

Similarly as discussed herein, the HARQ ACK/NACK and beam training request bit sequence 405 may be generated by the UE 115 using a codebook that identifies one of a number of available sequences for HARQ ACK/NACK transmission, and may include a sequence of bits that identify whether a code block group (CBG) or transport block (TB) was successfully or unsuccessfully received and decoded at the UE 115.

In some examples, combined HARQ ACK/NACK and beam training request bit sequence 405 may be transmitted on a PUCCH and may include an uplink control information (UCI) bit sequence. In one example, the UCI bit sequence may be $a_0, a_1, a_2, a_3, \ldots, a_{A-1}$ and may be determined by setting $a_i=\tilde{o}_i^{ACK}$ for $i=0, 1 \ldots, O^{ACK}-1$, $a_i=\tilde{o}_i^{BTR}$ for $i=O^{ACK}, O_{ACK}+1, \ldots, O^{ACK}+O^{BTR}-1$, and $A=O^{ACK}+O^{BTR}$, where the HARQ-ACK bit sequence ($O^{ACK}$) 410 is $\tilde{o}_o^{ACK}$, $\tilde{o}_1^{ACK}, \ldots, \tilde{o}_{o^{ACK}-1}^{ACK}$ and may be identified by a codebook determination (e.g., as defined in 3GPP TS 38.213), and where the beam training request (BTR) bit sequence ($O^{BTR}$) 415 is $\tilde{o}_o^{BTR}, \tilde{o}_1^{BTR}, \ldots, \tilde{o}_{o^{BTR}-1}^{BTR}$ and also may be identified by a codebook determination. In some cases, the beam training request may include information related to one or more measurements of a beam (e.g., whether one or more measurements is at or below a threshold value for triggering a beam training request), an indication that a beam training procedure is needed, an indication of one or more candidate beams or beam pair links, or any combinations thereof.

In some cases, the HARQ ACK/NACK and beam training request bit sequence 405 may be selected from a codebook with a number of available sequences for the HARQ ACK/NACK transmission, which may include one or more of an ACK-only sequence, a NACK-only sequence, a beam training request only sequence, or a sequence that indicates a combination of one or more of ACK, NACK, or beam training request information.

Figure 5:
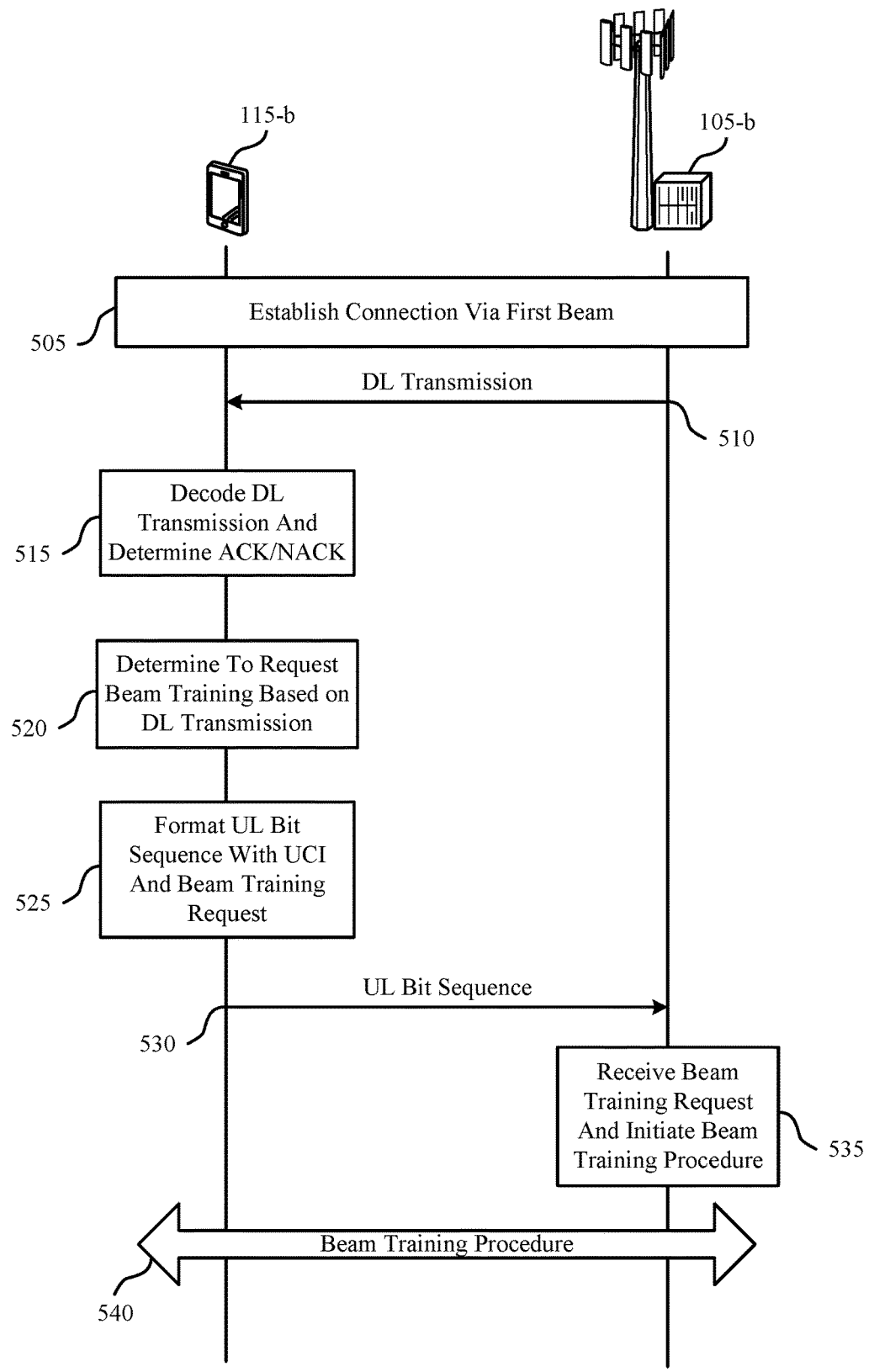
FIG. 5 illustrates an example of a process flow that supports beam training request techniques in beamformed wireless communications in accordance with aspects of the present disclosure.

FIG. 5 illustrates an example of a process flow 500 that supports beam training request techniques in beamformed wireless communications in accordance with aspects of the present disclosure. In some examples, process flow 500 may implement aspects of wireless communications system 100 or 200. The process flow 500 may include a base station 105-b and a UE 115-b, which may be examples of the corresponding devices described with reference to FIGS. 1 and 2. As discussed in this example, UE 115-b may transmit a combined control information and beam training request to base station 105-b to trigger a beam training procedure. Alternative examples of the following may be implemented, where some steps are performed in a different order than described or are not performed at all. In some cases, steps may include additional features not mentioned herein, or further steps may be added.

At 505, UE 115-b and base station 105-b may establish a connection. The connection may be established according to established RRC connection establishment techniques, and the connection may be established via a first beam of multiple available beams.

The base station 105-b, at 510, may transmit downlink transmission to the UE 115-b. In some cases, the downlink transmission may be transmitted via a first transmission beam and may include a DMRS for use by the UE 115-b in decoding the downlink transmission. For example, the downlink transmission may be a PDSCH transmission that includes a DMRS. In other examples, the downlink transmission may be a control channel transmission or a broadcast channel transmission.

At 515, the UE 115-b may attempt to decode the downlink transmission and determine feedback, such as ACK/NACK feedback. In some cases, the UE 115-b may receive signals associated with the downlink transmission and attempt to demodulate and decode the downlink transmission, and generate the ACK/NACK feedback based on whether the decoding is successful or not (e.g., based on whether a cyclic redundancy check (CRC) associated with the downlink transmission passes).

At 520, the UE 115-b may determine to request beam training based on the downlink transmission. In some cases, the UE 115-b may measure a DMRS, or other reference signal, associated with the downlink transmission, and determine that the transmission beam used for communications with the base station 105-b may be becoming unreliable (e.g., based on a RSRP, RSRQ, SNR, SINR, etc., of the DMRS being below a threshold value).

At 525, the UE 115-b may format an uplink bit sequence with uplink control information and a beam training request. In some cases, the uplink control may include HARQ ACK/NACK feedback information, and the beam training request may be appended to a bit sequence that contains the HARQ ACK/NACK feedback information. In some cases, the uplink control information may include, additionally or alternatively, an SR, a reference signal transmission, a reference signal quality indication, a reference signal index indication, or any combinations thereof. At 530, the UE 115-b may transmit the uplink bit sequence to the base station 105-b. In some cases, the UE 115-b may encode the uplink bit sequence and transmit the sequence through a PUCCH or PUSCH transmission.

At 535, the base station 105-b may receive the beam training request and initiate a beam training procedure. The UE 115-b and base station 105-b may then perform beam training procedure, at 540. In some cases, the base station 105-b may initiate one or more of a P1, P2, or P3 beam refinement procedure to establish and/or refine a beam pair link with the UE 115-b. In some cases, the base station 105-b may transmit a beam switch command to the UE 115-b as part on the beam training procedure to switch from the first transmission beam to a second beam responsive to one or more measurements. In some cases, the second beam is a second downlink transmission beam. In some cases, the second beam is a second downlink reception beam that is different from a reception beam used that the UE 115-b to receive communications over the first transmission beam.

Figure 6:
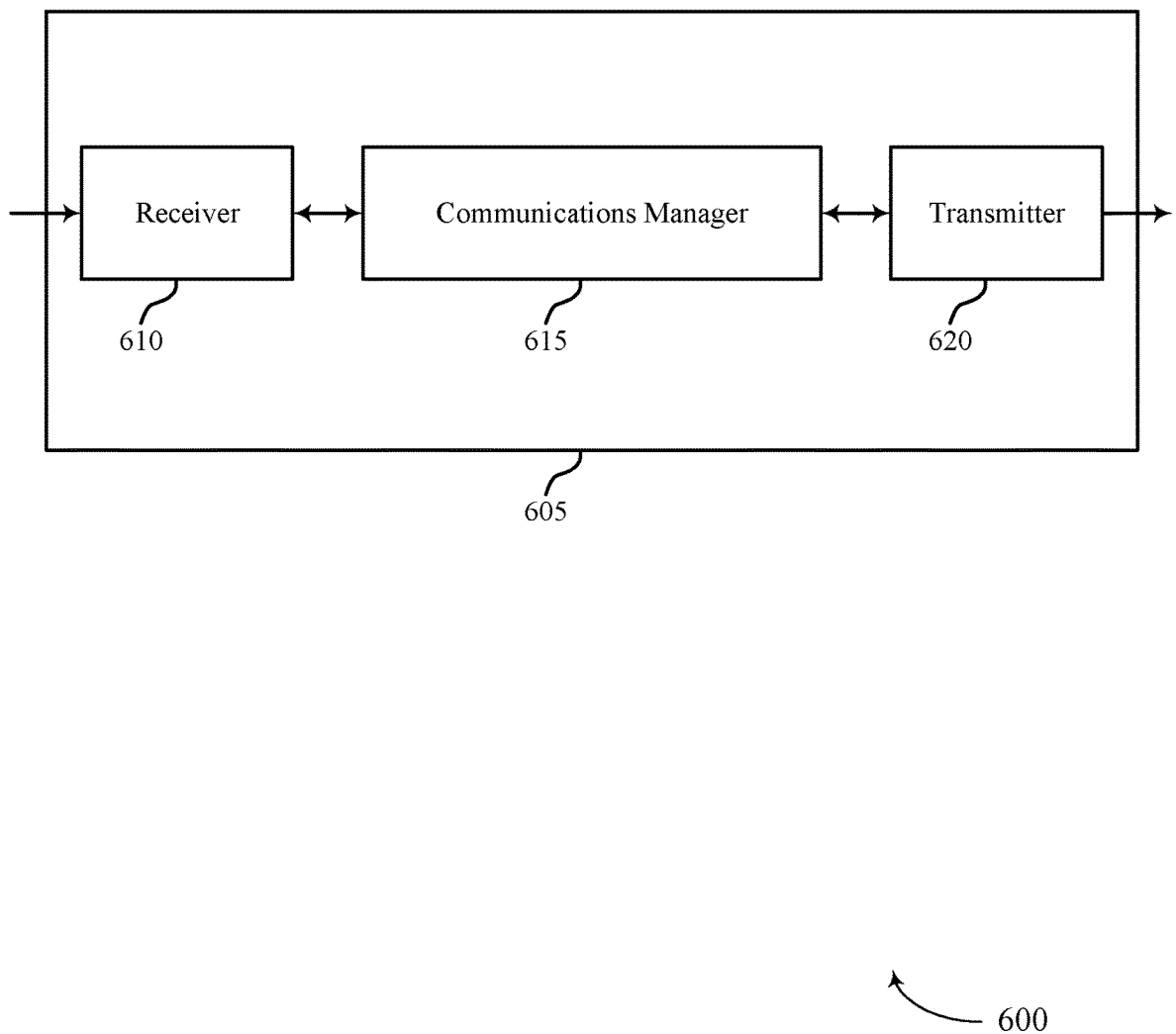
FIGS. 6 and 7 show block diagrams of devices that support beam training request techniques in beamformed wireless communications in accordance with aspects of the present disclosure.

FIG. 6 shows a block diagram 600 of a device 605 that supports beam training request techniques in beamformed wireless communications in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to beam training request techniques in beamformed wireless communications, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive a downlink transmission from a base station in a first transmission beam, determine, based on a signal quality of the first transmission beam being below a threshold value, to transmit a beam training request to the base station to identify a second transmission beam for communications between the UE and the base station, identify a combined uplink control information sequence that combines the beam training request with uplink control information to be transmitted to the base station in uplink resources associated with the uplink control information, and transmit the combined uplink control information sequence to the base station using the uplink resources. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
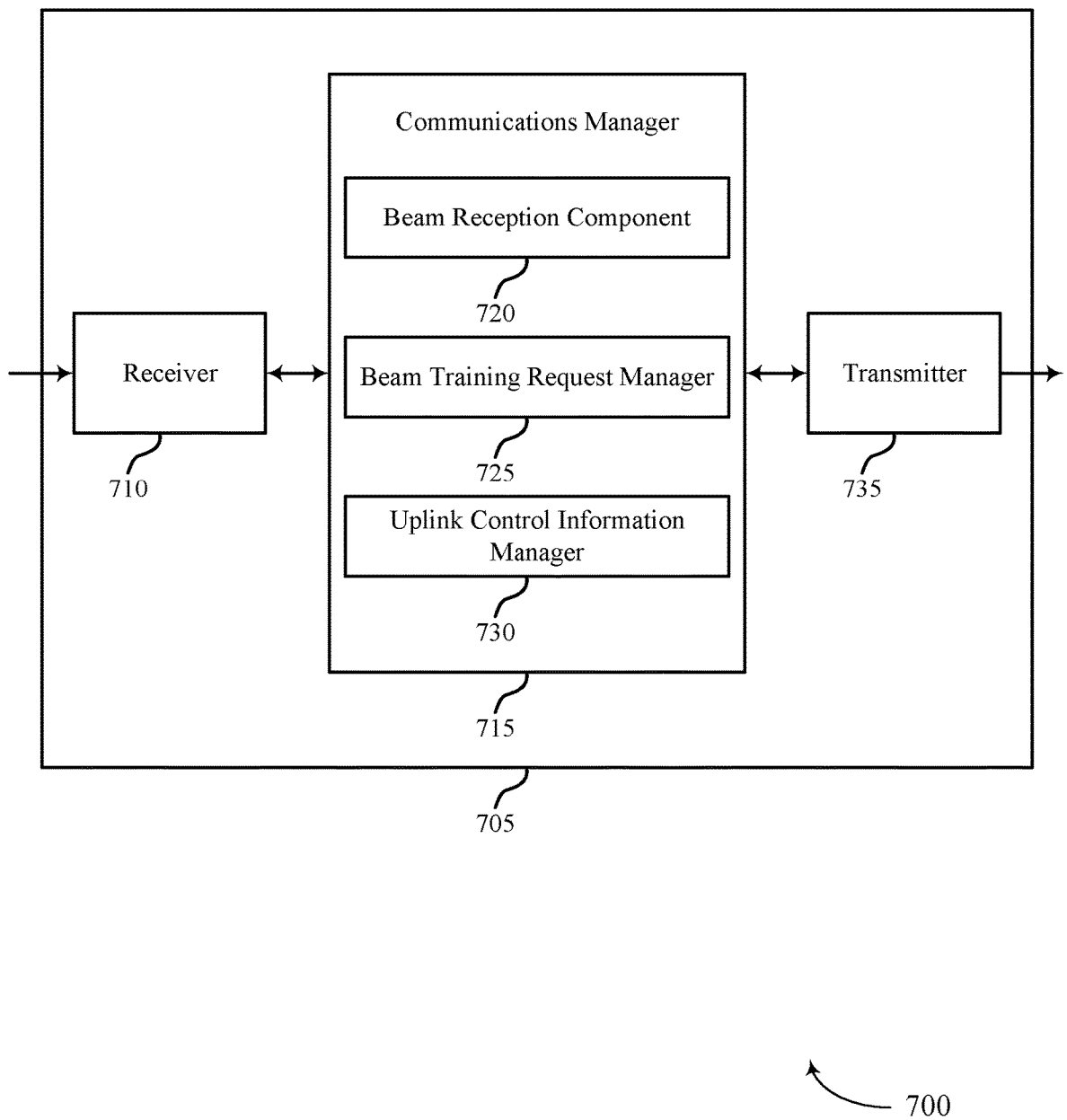

FIG. 7 shows a block diagram 700 of a device 705 that supports beam training request techniques in beamformed wireless communications in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to beam training request techniques in beamformed wireless communications, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a beam reception component 720, a beam training request manager 725, and an uplink control information manager 730. The communications manager 715 may be an example of aspects of the communications manager 910 described herein.

The beam reception component 720 may receive a downlink transmission from a base station in a first transmission beam.

The beam training request manager 725 may determine, based on a signal quality of the first transmission beam being below a threshold value, to transmit a beam training request to the base station to identify a second transmission beam for communications between the UE and the base station.

The uplink control information manager 730 may identify a combined uplink control information sequence that combines the beam training request with uplink control information to be transmitted to the base station in uplink resources associated with the uplink control information and transmit the combined uplink control information sequence to the base station using the uplink resources.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
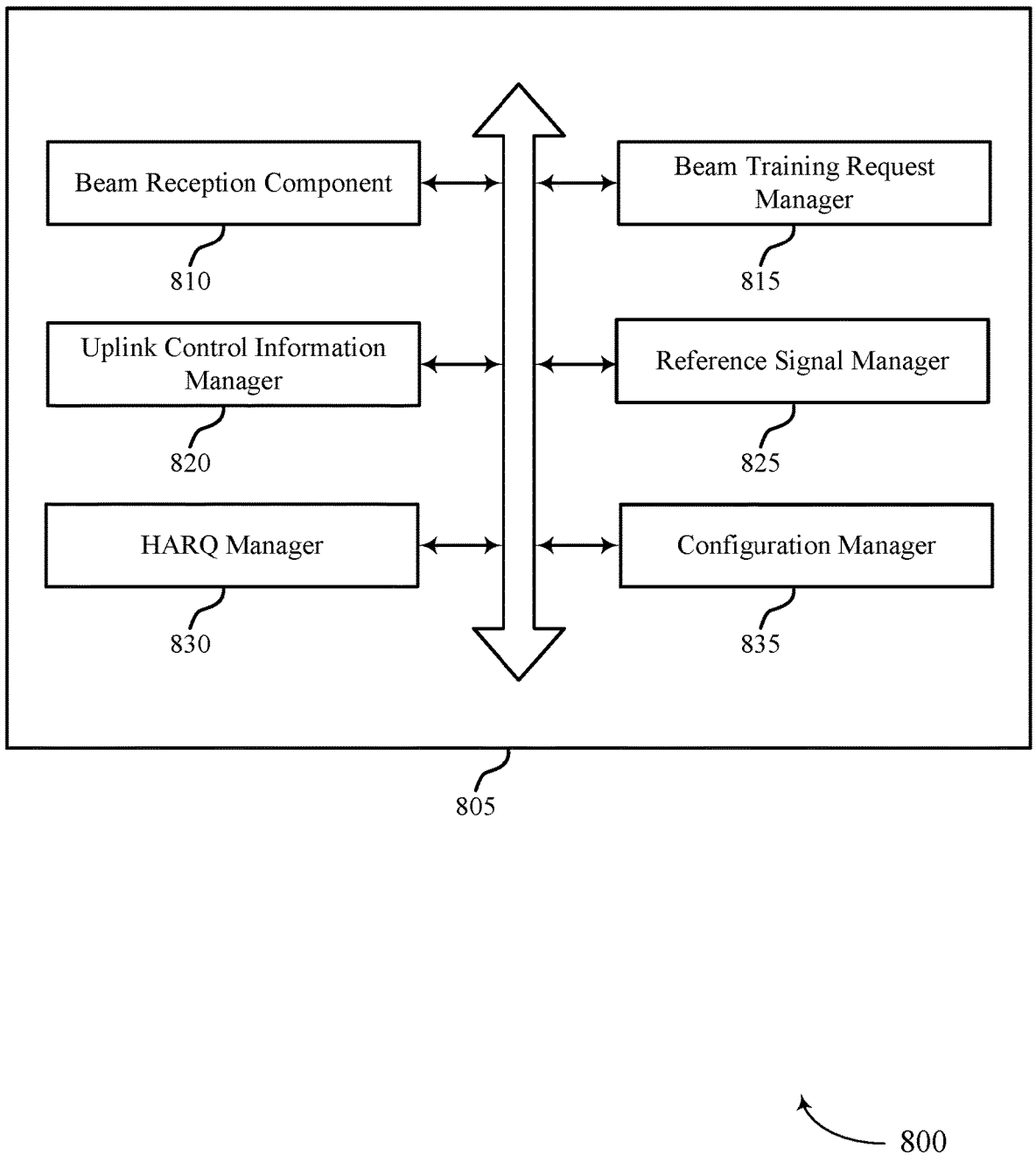
FIG. 8 shows a block diagram of a communications manager that supports beam training request techniques in beamformed wireless communications in accordance with aspects of the present disclosure.

FIG. 8 shows a block diagram 800 of a communications manager 805 that supports beam training request techniques in beamformed wireless communications in accordance with aspects of the present disclosure. The communications manager 805 may be an example of aspects of a communications manager 615, a communications manager 715, or a communications manager 910 described herein. The communications manager 805 may include a beam reception component 810, a beam training request manager 815, an uplink control information manager 820, an uplink control information manager 825, a reference signal manager 830, a HARQ manager 835, and a configuration manager 840. Each of these modules may communicate, directly or indirectly, with one another (e.g., via one or more buses).

The beam reception component 810 may receive a downlink transmission from a base station in a first transmission beam. In some examples, the beam reception component 810 may monitor one or more transmission beams from the base station, including the second transmission beam. In some examples, the beam reception component 810 may receive a beam switch command from the base station to switch from the first transmission beam to the second transmission beam responsive to the measurement information.

The beam training request manager 815 may determine, based on a signal quality of the first transmission beam being below a threshold value, to transmit a beam training request to the base station to identify a second transmission beam for communications between the UE and the base station. In some examples, the beam training request manager 815 may receive a beam training indication from the base station that initiates a beam training procedure.

The uplink control information manager 820 may identify a combined uplink control information sequence that combines the beam training request with uplink control information to be transmitted to the base station in uplink resources associated with the uplink control information. In some examples, the uplink control information manager 820 may transmit the combined uplink control information sequence to the base station using the uplink resources. In some examples, the uplink control information manager 820 may encode a control channel sequence and a beam training request sequence into the combined uplink control information sequence. In some examples, the uplink control information manager 820 may transmit the combined uplink control information sequence through a physical uplink control channel or a physical uplink shared channel. In some cases, the uplink control information includes one or more of HARQ acknowledgment/negative-acknowledgment (ACK/NACK) information, a scheduling request (SR), a reference signal transmission, a reference signal quality indication, a reference signal index indication, or any combinations thereof.

The reference signal manager 825 may transmit measurement information associated with the monitored one or more transmission beams to the base station. In some cases, the reference signal quality indication provides one or more of RSRP, RSRQ, SNR, SINR, or any combinations thereof. In some cases, the reference signal includes one or more of a synchronization signal, a DMRS, CSI-RS, or any combinations thereof.

The HARQ manager 830 may determine and format HARQ feedback transmissions, and monitor for retransmissions. In some cases, the uplink control information is a HARQ ACK/NACK transmission and the combined uplink control information sequence is selected from a set of available sequences for the HARQ ACK/NACK transmission, where the set of available sequences include one or more of an ACK-only sequence, a NACK-only sequence, a beam training request only sequence, or a sequence that indicates a combination of one or more of ACK, NACK, or beam training request information. In some cases, the combined uplink control information sequence includes a first portion that includes ACK/NACK bits and a second portion that includes beam training request bits.

The configuration manager 835 may receive, from the base station, configuration information for the combined uplink control information sequence in one or more of a PDCCH, a MAC-CE, RRC signaling, SI signaling, a master information block, or any combinations thereof.

The actions performed by the communications manager 805 as described herein may be implemented to realize one or more potential advantages One implementation may allow a UE 115 to increase efficiency in beam-training requests in a beam-forming system, and allow the UE 115 to determine high quality beams for connection processes. Additionally or alternatively, the UE 115 may also identify degrading beams and determine whether to transmit a beam training request to the base station 105, which may improve efficiency in beam-switching and therefore improve communication quality.

Figure 9:
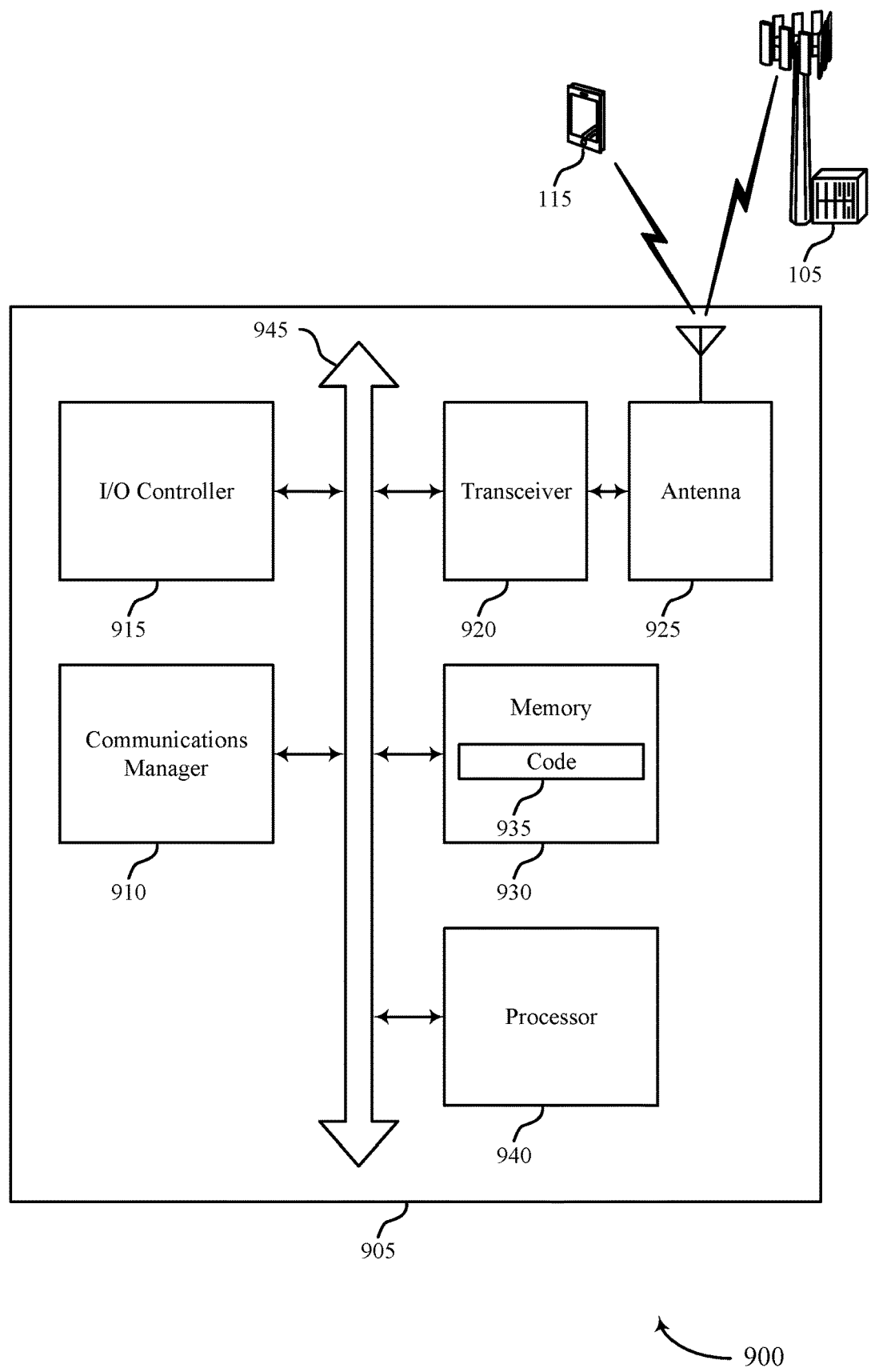
FIG. 9 shows a diagram of a system including a device that supports beam training request techniques in beamformed wireless communications in accordance with aspects of the present disclosure.

FIG. 9 shows a diagram of a system 900 including a device 905 that supports beam training request techniques in beamformed wireless communications in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive a downlink transmission from a base station in a first transmission beam, determine, based on a signal quality of the first transmission beam being below a threshold value, to transmit a beam training request to the base station to identify a second transmission beam for communications between the UE and the base station, identify a combined uplink control information sequence that combines the beam training request with uplink control information to be transmitted to the base station in uplink resources associated with the uplink control information, and transmit the combined uplink control information sequence to the base station using the uplink resources.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random access memory (RAM) and read only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting beam training request techniques in beamformed wireless communications).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
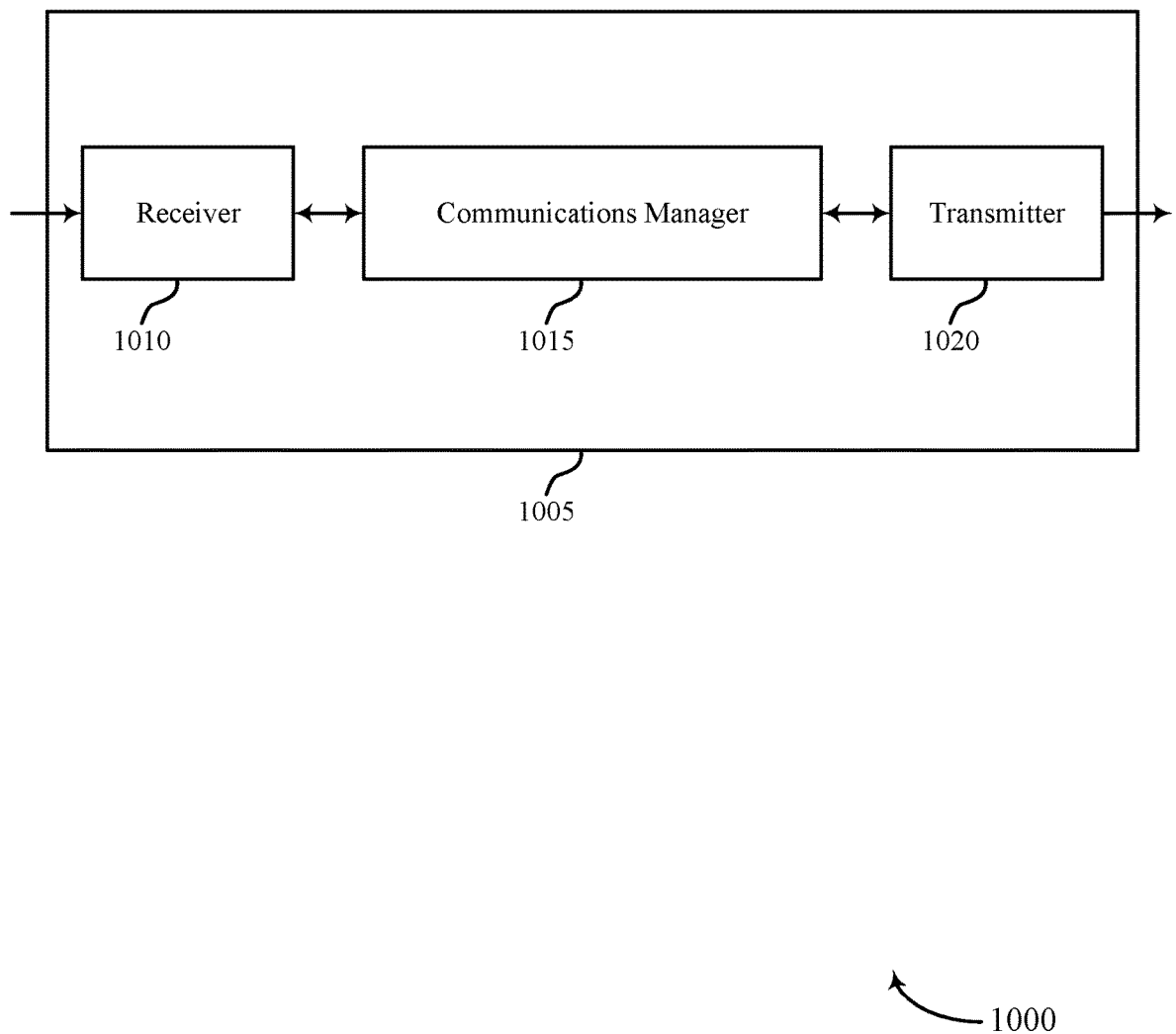
FIGS. 10 and 11 show block diagrams of devices that support beam training request techniques in beamformed wireless communications in accordance with aspects of the present disclosure.

FIG. 10 shows a block diagram 1000 of a device 1005 that supports beam training request techniques in beamformed wireless communications in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to beam training request techniques in beamformed wireless communications, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit one or more downlink transmissions to a UE in a first transmission beam, receive from the UE, in allocated resources for an uplink control information transmission, a combined uplink control information sequence that includes a beam training request and uplink control information associated with the one or more downlink transmissions, where the beam training request indicates that a signal quality of the first transmission beam at the UE is below a threshold value, and initiate, responsive to receiving the combined uplink control information sequence, a beam training sequence to identify a second transmission beam for communications between the base station and the UE. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

A processor of a UE 115 (e.g., controlling the receiver 1010, the transmitter 1020, or the transceiver 1320 as described with reference to FIG. 13) may efficiently determine signal quality of beams and as a result, determine when to switch beams based on the signal quality. This beam quality determination and beam training request procedure may improve the efficiency of beam switching within a wireless communications system. The processor of the UE 115 may control the transmitter 1020 and receiver 1010 of the UE 115 to coordinate connections with beams and determine signal quality of beams to determine when to switch beams and which beams to switch to. The processor of the UE 115 may also control the transmitted 1020 and receiver 1010 to encode a control channel sequence and a beam training request sequence into a combined uplink control information sequence, which may further improve efficiency by reducing signaling overhead and thus reducing latency.

Figure 11:
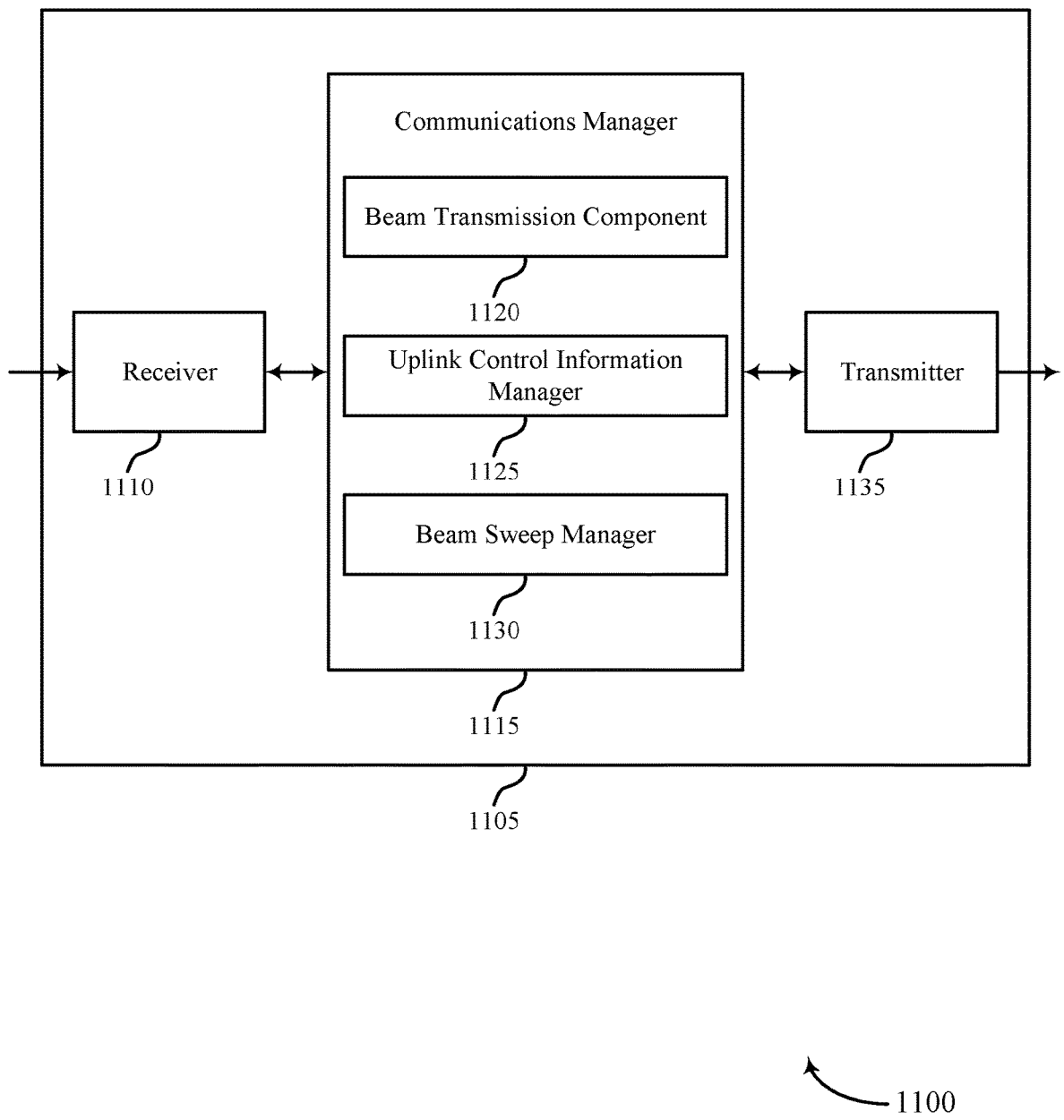

FIG. 11 shows a block diagram 1100 of a device 1105 that supports beam training request techniques in beamformed wireless communications in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to beam training request techniques in beamformed wireless communications, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a beam transmission component 1120, an uplink control information manager 1125, and a beam sweep manager 1130. The communications manager 1115 may be an example of aspects of the communications manager 1310 described herein.

The beam transmission component 1120 may transmit one or more downlink transmissions to a UE in a first transmission beam.

The uplink control information manager 1125 may receive from the UE, in allocated resources for an uplink control information transmission, a combined uplink control information sequence that includes a beam training request and uplink control information associated with the one or more downlink transmissions, where the beam training request indicates that a signal quality of the first transmission beam at the UE is below a threshold value.

The beam sweep manager 1130 may initiate, responsive to receiving the combined uplink control information sequence, a beam training sequence to identify a second transmission beam for communications between the base station and the UE.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
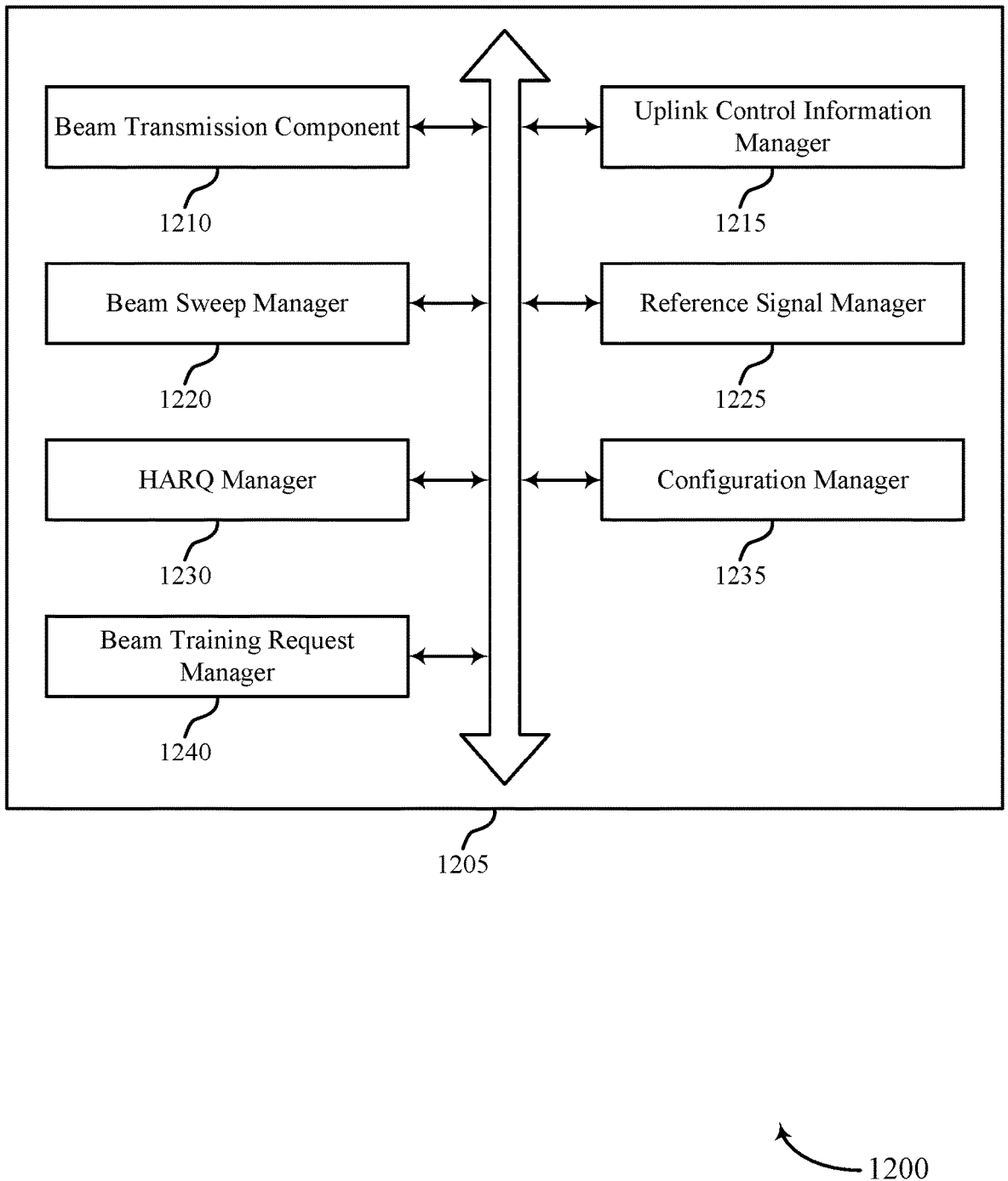
FIG. 12 shows a block diagram of a communications manager that supports beam training request techniques in beamformed wireless communications in accordance with aspects of the present disclosure.

FIG. 12 shows a block diagram 1200 of a communications manager 1205 that supports beam training request techniques in beamformed wireless communications in accordance with aspects of the present disclosure. The communications manager 1205 may be an example of aspects of a communications manager 1015, a communications manager 1115, or a communications manager 1310 described herein.

The communications manager 1205 may include a beam transmission component 1210, an uplink control information manager 1215, a beam sweep manager 1220, a reference signal manager 1225, a HARQ manager 1230, a configuration manager 1235, and a beam training request manager 1240. Each of these modules may communicate, directly or indirectly, with one another (e.g., via one or more buses).

The beam transmission component 1210 may transmit one or more downlink transmissions to a UE in a first transmission beam. In some examples, the beam transmission component 1210 may determine to switch the UE from the first transmission beam to a second transmission beam based on measurement information. In some examples, the beam transmission component 1210 may transmit a beam switch command to the UE to switch from the first transmission beam to the second transmission beam.

The uplink control information manager 1215 may receive from the UE, in allocated resources for an uplink control information transmission, a combined uplink control information sequence that includes a beam training request and uplink control information associated with the one or more downlink transmissions, where the beam training request indicates that a signal quality of the first transmission beam at the UE is below a threshold value. In some examples, the uplink control information manager 1215 may receive the combined uplink control information sequence through a physical uplink control channel or a physical uplink shared channel. In some cases, the combined uplink control information sequence includes a control channel sequence and a beam training request sequence that are encoded into the combined uplink control information sequence. In some cases, the uplink control information includes one or more of HARQ acknowledgment/negative-acknowledgment (ACK/NACK) information, a scheduling request (SR), a reference signal transmission, a reference signal quality indication, a reference signal index indication, or any combinations thereof.

The beam sweep manager 1220 may initiate, responsive to receiving the combined uplink control information sequence, a beam training sequence to identify a second transmission beam for communications between the base station and the UE. In some examples, the beam sweep manager 1220 may transmit a set of transmission beams, including the second transmission beam, for measurement by the UE. The reference signal manager 1225 may receive, from the UE, measurement information associated with the set of transmission beams. In some cases, the reference signal quality indication provides one or more of RSRP, RSRQ, SNR, SINR, or any combinations thereof. In some cases, the reference signal includes one or more of a synchronization signal, a DMRS, CSI-RS, or any combinations thereof.

The HARQ manager 1230 may manage HARQ ACK/NACK feedback and retransmissions. In some cases, the uplink control information is a HARQ ACK/NACK transmission and the combined uplink control information sequence is selected from a set of available sequences for the HARQ ACK/NACK transmission, where the set of available sequence include one or more of an ACK-only sequence, a NACK-only sequence, a beam training request only sequence, or a sequence that indicates a combination of one or more of ACK, NACK, or beam training request information. In some cases, the combined uplink control information sequence includes a first portion that includes ACK/NACK bits and a second portion that includes beam training request bits.

The configuration manager 1235 may transmit configuration information to the UE in one or more of a PDCCH, a MAC-CE, RRC signaling, SI signaling, a master information block, or any combinations thereof, where the configuration information enables the UE to transmit the combined uplink control information sequence.

The beam training request manager 1240 may transmit a beam training indication to the UE to initiate a beam training procedure.

Figure 13:
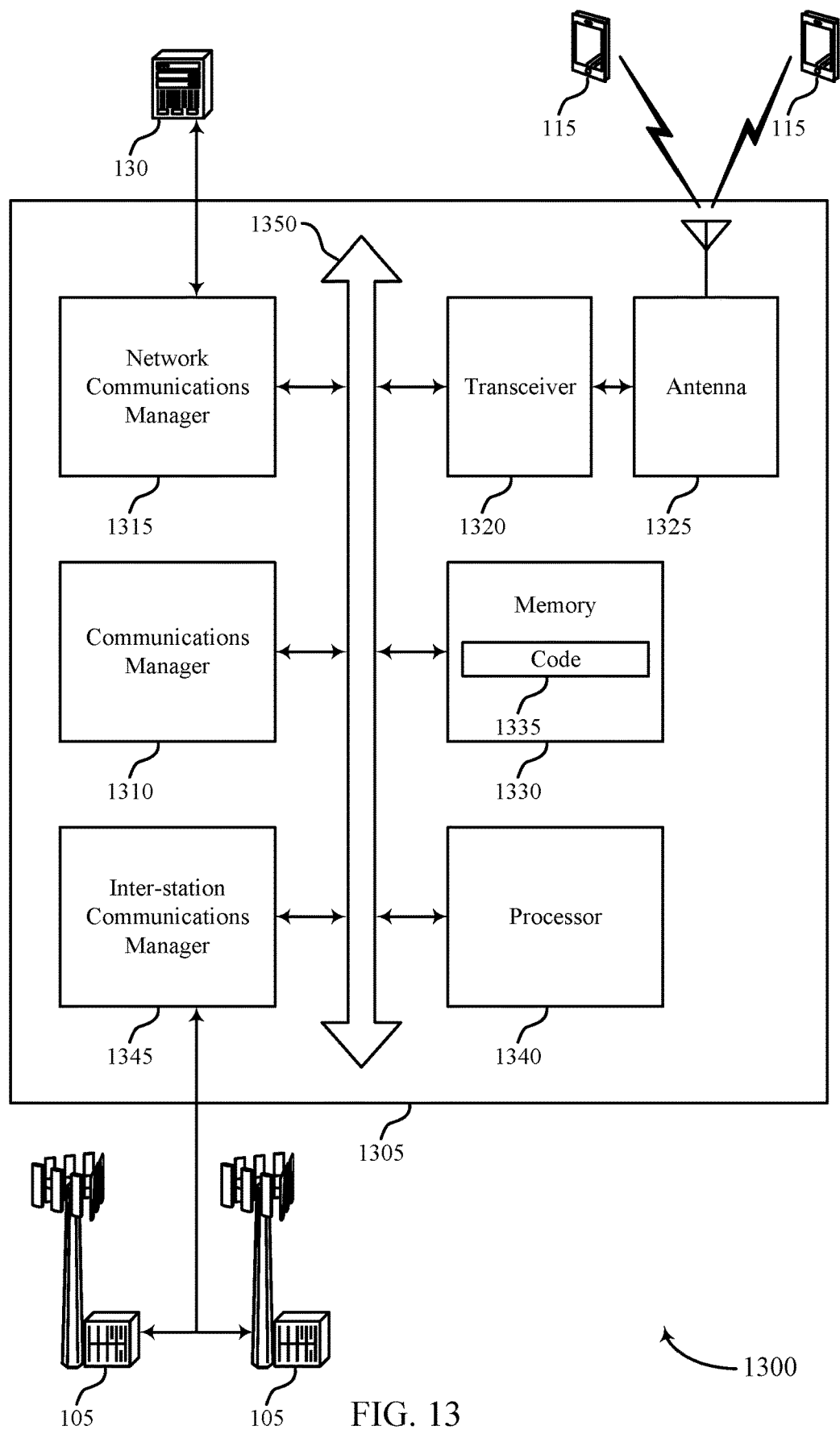
FIG. 13 shows a diagram of a system including a device that supports beam training request techniques in beamformed wireless communications in accordance with aspects of the present disclosure.

FIG. 13 shows a diagram of a system 1300 including a device 1305 that supports beam training request techniques in beamformed wireless communications in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit one or more downlink transmissions to a UE in a first transmission beam, receive from the UE, in allocated resources for an uplink control information transmission, a combined uplink control information sequence that includes a beam training request and uplink control information associated with the one or more downlink transmissions, where the beam training request indicates that a signal quality of the first transmission beam at the UE is below a threshold value, and initiate, responsive to receiving the combined uplink control information sequence, a beam training sequence to identify a second transmission beam for communications between the base station and the UE.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting beam training request techniques in beamformed wireless communications).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
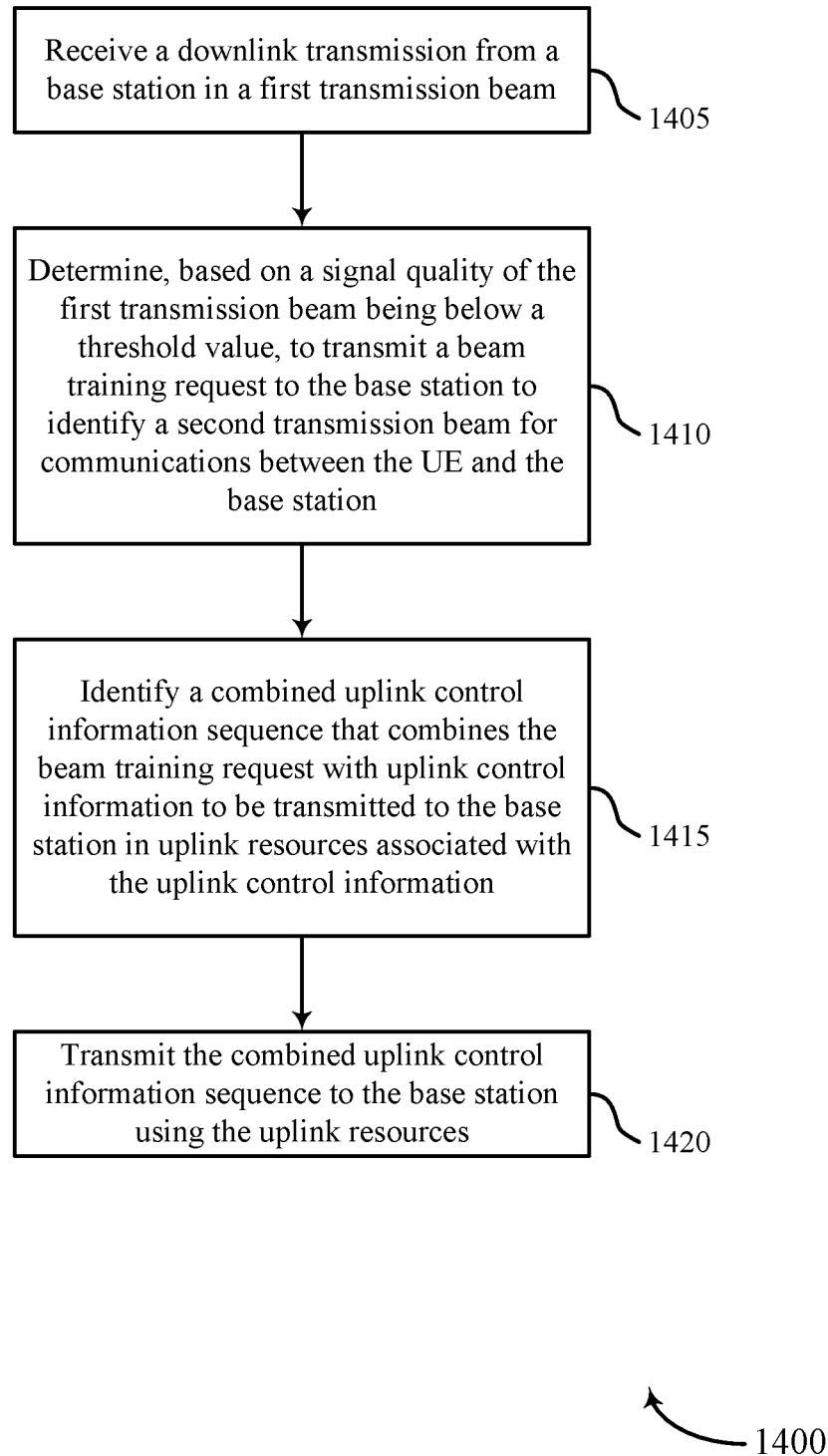
FIGS. 14 through 18 show flowcharts illustrating methods that support beam training request techniques in beamformed wireless communications in accordance with aspects of the present disclosure.

FIG. 14 shows a flowchart illustrating a method 1400 that supports beam training request techniques in beamformed wireless communications in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may receive a downlink transmission from a base station in a first transmission beam. The operations of 1405 may be performed according to the methods described herein. In some examples, aspects of the operations of 1405 may be performed by a beam reception component as described with reference to FIGS. 6 through 9.

At 1410, the UE may determine, based on a signal quality of the first transmission beam being below a threshold value, to transmit a beam training request to the base station to identify a second transmission beam for communications between the UE and the base station. The operations of 1410 may be performed according to the methods described herein. In some examples, aspects of the operations of 1410 may be performed by a beam training request manager as described with reference to FIGS. 6 through 9.

At 1415, the UE may identify a combined uplink control information sequence that combines the beam training request with uplink control information to be transmitted to the base station in uplink resources associated with the uplink control information. The operations of 1415 may be performed according to the methods described herein. In some examples, aspects of the operations of 1415 may be performed by an uplink control information manager as described with reference to FIGS. 6 through 9.

At 1420, the UE may transmit the combined uplink control information sequence to the base station using the uplink resources. The operations of 1420 may be performed according to the methods described herein. In some examples, aspects of the operations of 1420 may be performed by an uplink control information manager as described with reference to FIGS. 6 through 9.

Figure 15:
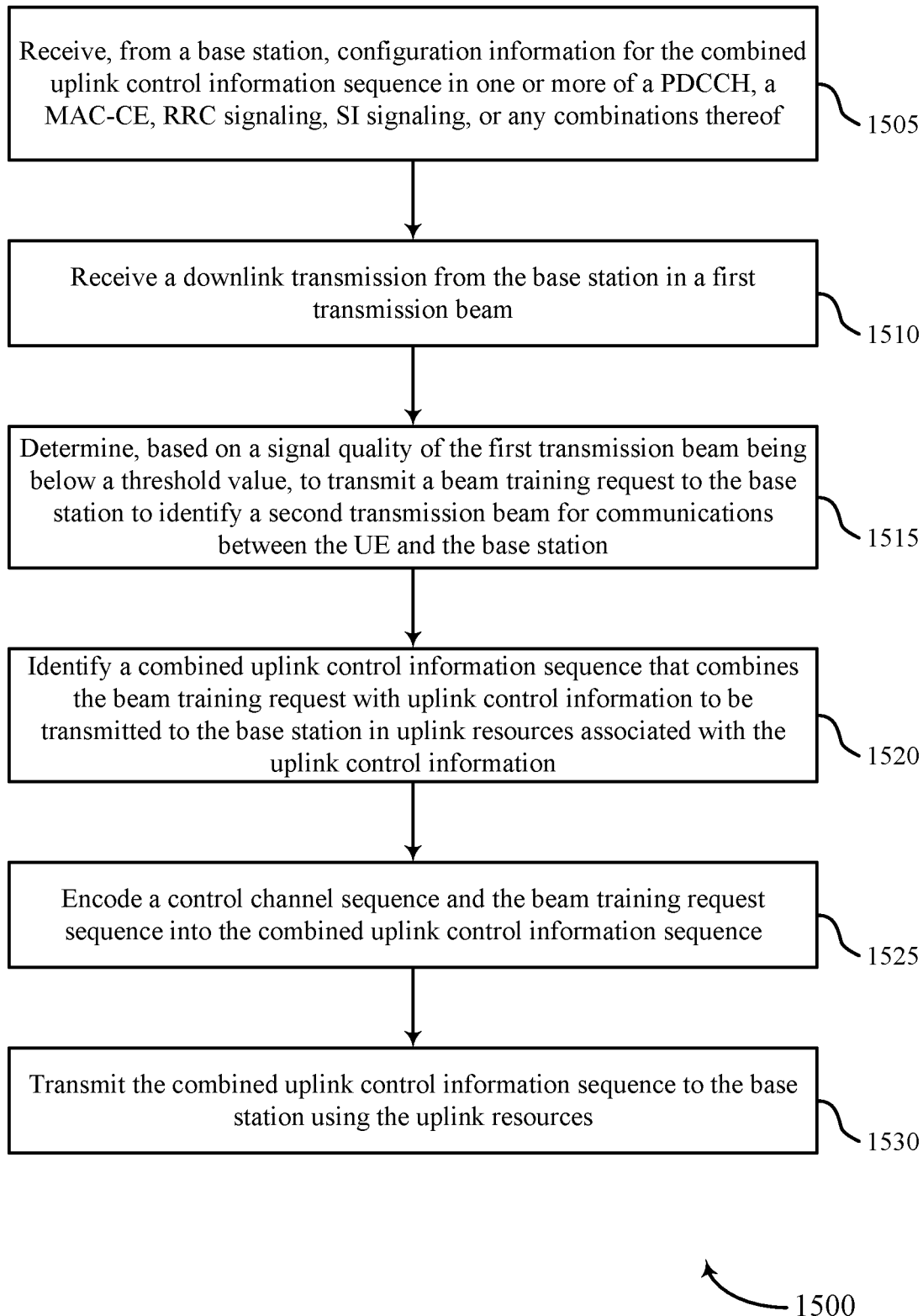

FIG. 15 shows a flowchart illustrating a method 1500 that supports beam training request techniques in beamformed wireless communications in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may receive, from a base station, configuration information for the combined uplink control information sequence in one or more of a PDCCH, a MAC-CE, RRC signaling, SI signaling, a master information block, or any combinations thereof. The operations of 1505 may be performed according to the methods described herein. In some examples, aspects of the operations of 1505 may be performed by a configuration manager as described with reference to FIGS. 6 through 9.

At 1510, the UE may receive a downlink transmission from the base station in a first transmission beam. The operations of 1510 may be performed according to the methods described herein. In some examples, aspects of the operations of 1510 may be performed by a beam reception component as described with reference to FIGS. 6 through 9.

At 1515, the UE may determine, based on a signal quality of the first transmission beam being below a threshold value, to transmit a beam training request to the base station to identify a second transmission beam for communications between the UE and the base station. The operations of 1515 may be performed according to the methods described herein. In some examples, aspects of the operations of 1515 may be performed by a beam training request manager as described with reference to FIGS. 6 through 9.

At 1520, the UE may identify a combined uplink control information sequence that combines the beam training request with uplink control information to be transmitted to the base station in uplink resources associated with the uplink control information. The operations of 1520 may be performed according to the methods described herein. In some examples, aspects of the operations of 1520 may be performed by an uplink control information manager as described with reference to FIGS. 6 through 9.

At 1525, the UE may encode a control channel sequence and the beam training request sequence into the combined uplink control information sequence. The operations of 1525 may be performed according to the methods described herein. In some examples, aspects of the operations of 1525 may be performed by an uplink control information manager as described with reference to FIGS. 6 through 9.

At 1530, the UE may transmit the combined uplink control information sequence to the base station using the uplink resources. The operations of 1530 may be performed according to the methods described herein. In some examples, aspects of the operations of 1530 may be performed by an uplink control information manager as described with reference to FIGS. 6 through 9.

Figure 16:
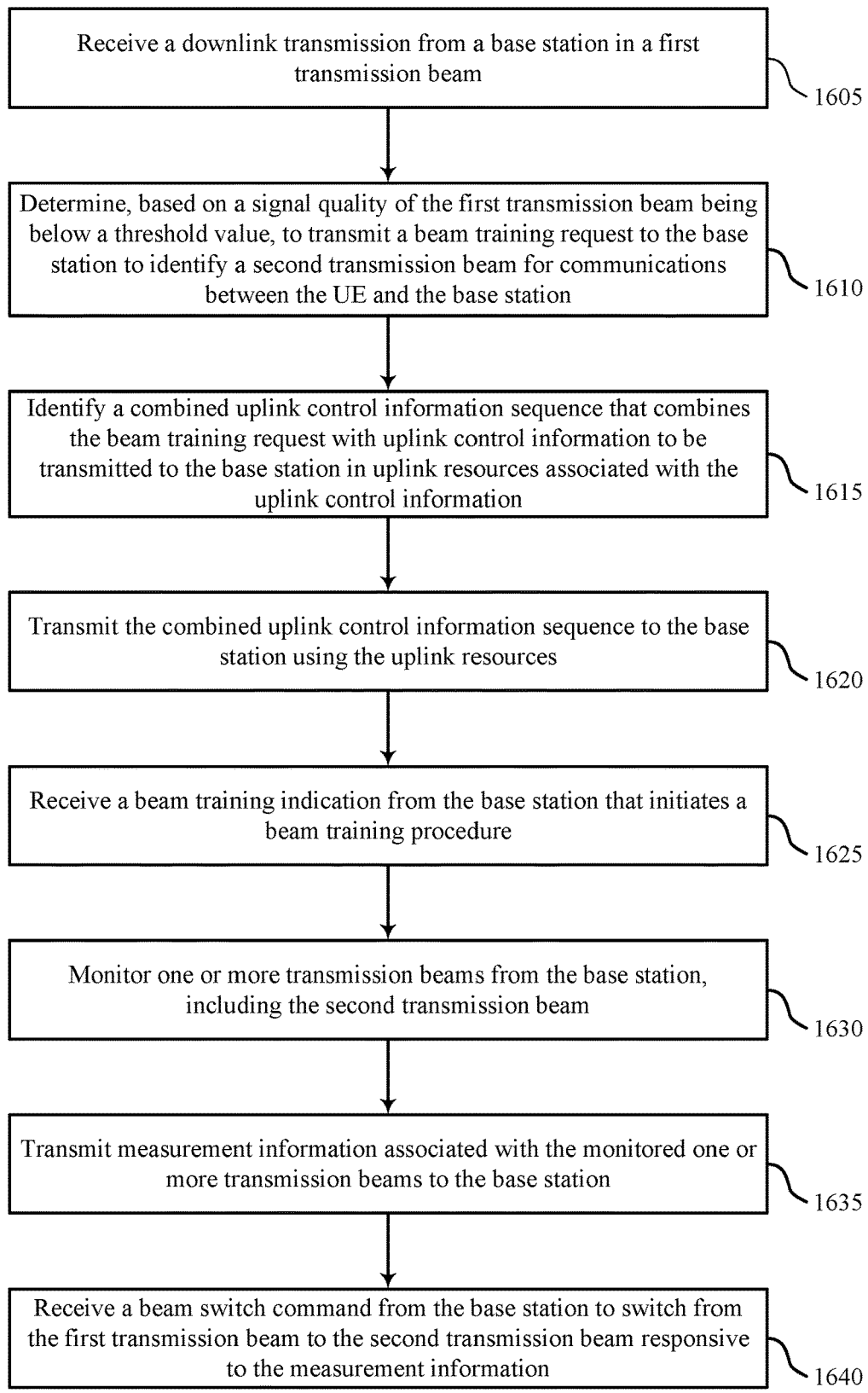

FIG. 16 shows a flowchart illustrating a method 1600 that supports beam training request techniques in beamformed wireless communications in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1605, the UE may receive a downlink transmission from a base station in a first transmission beam. The operations of 1605 may be performed according to the methods described herein. In some examples, aspects of the operations of 1605 may be performed by a beam reception component as described with reference to FIGS. 6 through 9.

At 1610, the UE may determine, based on a signal quality of the first transmission beam being below a threshold value, to transmit a beam training request to the base station to identify a second transmission beam for communications between the UE and the base station. The operations of 1610 may be performed according to the methods described herein. In some examples, aspects of the operations of 1610 may be performed by a beam training request manager as described with reference to FIGS. 6 through 9.

At 1615, the UE may identify a combined uplink control information sequence that combines the beam training request with uplink control information to be transmitted to the base station in uplink resources associated with the uplink control information. The operations of 1615 may be performed according to the methods described herein. In some examples, aspects of the operations of 1615 may be performed by an uplink control information manager as described with reference to FIGS. 6 through 9.

At 1620, the UE may transmit the combined uplink control information sequence to the base station using the uplink resources. The operations of 1620 may be performed according to the methods described herein. In some examples, aspects of the operations of 1620 may be performed by an uplink control information manager as described with reference to FIGS. 6 through 9.

At 1625, the UE may receive a beam training indication from the base station that initiates a beam training procedure. The operations of 1625 may be performed according to the methods described herein. In some examples, aspects of the operations of 1625 may be performed by a beam training request manager as described with reference to FIGS. 6 through 9.

At 1630, the UE may monitor one or more transmission beams from the base station, including the second transmission beam. The operations of 1630 may be performed according to the methods described herein. In some examples, aspects of the operations of 1630 may be performed by a beam reception component as described with reference to FIGS. 6 through 9.

At 1635, the UE may transmit measurement information associated with the monitored one or more transmission beams to the base station. The operations of 1635 may be performed according to the methods described herein. In some examples, aspects of the operations of 1635 may be performed by a reference signal manager as described with reference to FIGS. 6 through 9.

At 1640, the UE may receive a beam switch command from the base station to switch from the first transmission beam to the second transmission beam responsive to the measurement information. The operations of 1640 may be performed according to the methods described herein. In some examples, aspects of the operations of 1640 may be performed by a beam reception component as described with reference to FIGS. 6 through 9.

Figure 17:
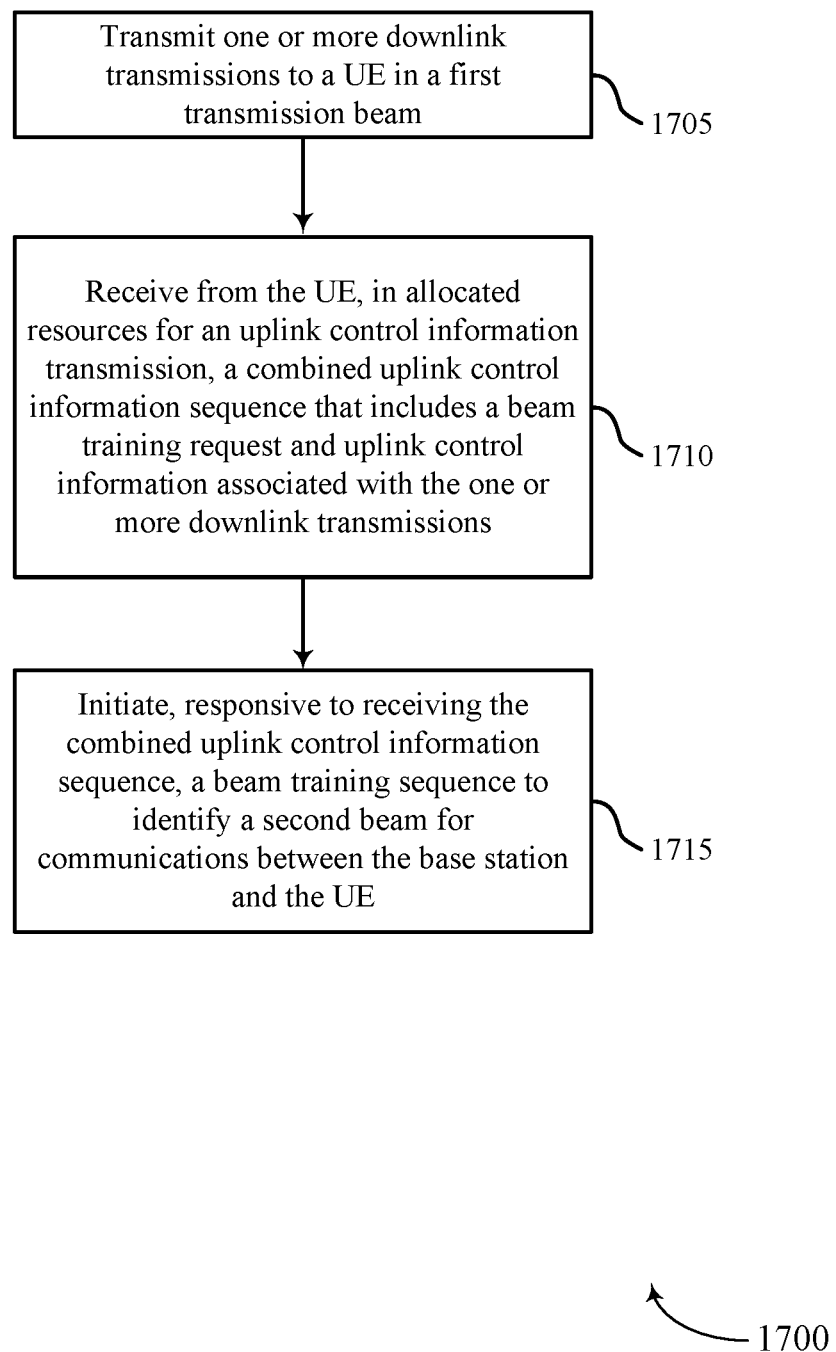

FIG. 17 shows a flowchart illustrating a method 1700 that supports beam training request techniques in beamformed wireless communications in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1705, the base station may transmit one or more downlink transmissions to a UE in a first transmission beam. The operations of 1705 may be performed according to the methods described herein. In some examples, aspects of the operations of 1705 may be performed by a beam transmission component as described with reference to FIGS. 10 through 13.

At 1710, the base station may receive from the UE, in allocated resources for an uplink control information transmission, a combined uplink control information sequence that includes a beam training request and uplink control information associated with the one or more downlink transmissions. The operations of 1710 may be performed according to the methods described herein. In some examples, aspects of the operations of 1710 may be performed by an uplink control information manager as described with reference to FIGS. 10 through 13.

At 1715, the base station may initiate, responsive to receiving the combined uplink control information sequence, a beam training sequence to identify a second beam for communications between the base station and the UE. The operations of 1715 may be performed according to the methods described herein. In some examples, aspects of the operations of 1715 may be performed by a beam sweep manager as described with reference to FIGS. 10 through 13.

Figure 18:
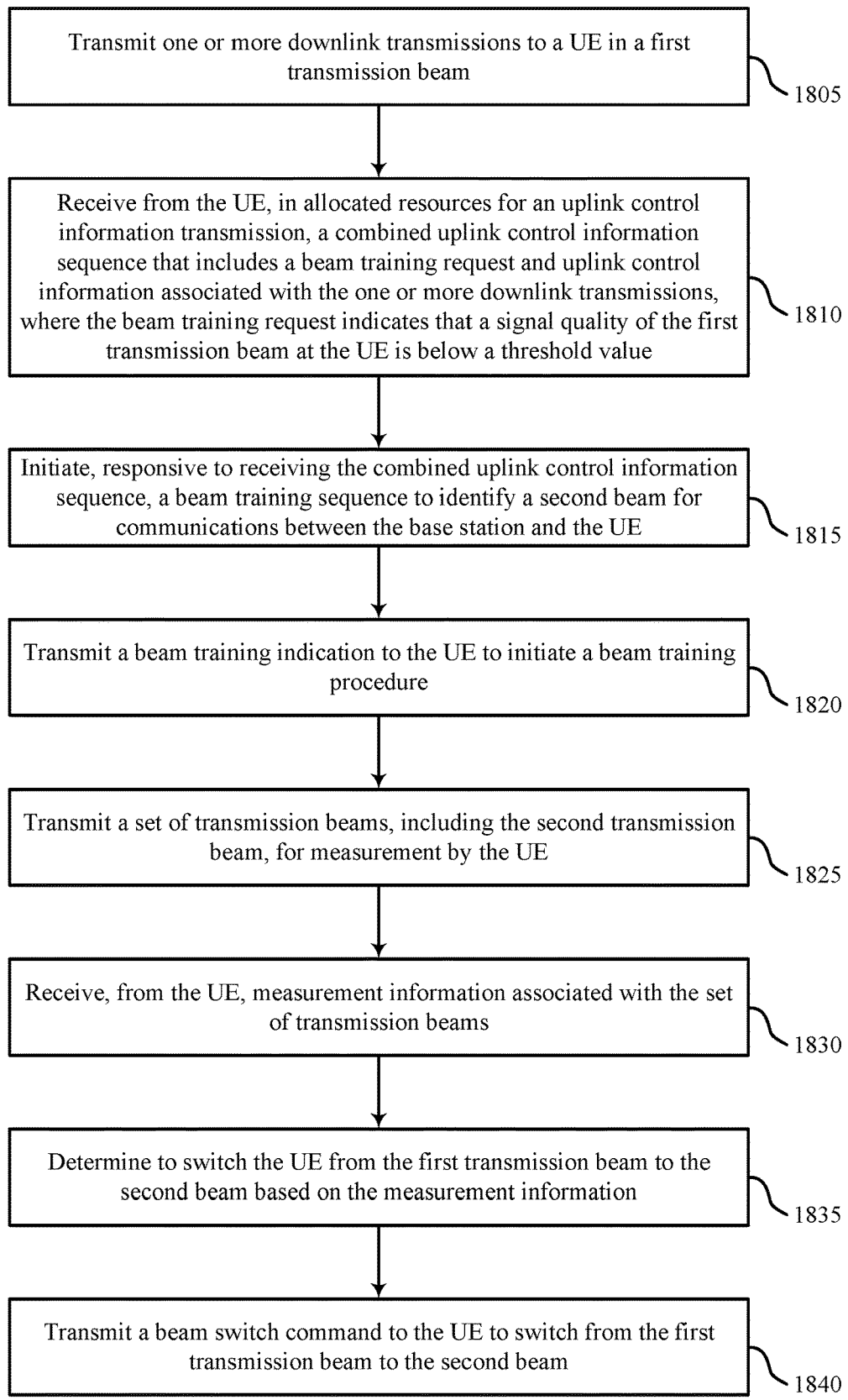

FIG. 18 shows a flowchart illustrating a method 1800 that supports beam training request techniques in beamformed wireless communications in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1805, the base station may transmit one or more downlink transmissions to a UE in a first transmission beam. The operations of 1805 may be performed according to the methods described herein. In some examples, aspects of the operations of 1805 may be performed by a beam transmission component as described with reference to FIGS. 10 through 13.

At 1810, the base station may receive from the UE, in allocated resources for an uplink control information transmission, a combined uplink control information sequence that includes a beam training request and uplink control information associated with the one or more downlink transmissions, where the beam training request indicates that a signal quality of the first transmission beam at the UE is below a threshold value. The operations of 1810 may be performed according to the methods described herein. In some examples, aspects of the operations of 1810 may be performed by an uplink control information manager as described with reference to FIGS. 10 through 13.

At 1815, the base station may initiate, responsive to receiving the combined uplink control information sequence, a beam training sequence to identify a second beam for communications between the base station and the UE. The operations of 1815 may be performed according to the methods described herein. In some examples, aspects of the operations of 1815 may be performed by a beam sweep manager as described with reference to FIGS. 10 through 13.

At 1820, the base station may transmit a beam training indication to the UE to initiate a beam training procedure. The operations of 1820 may be performed according to the methods described herein. In some examples, aspects of the operations of 1820 may be performed by a beam training request manager as described with reference to FIGS. 10 through 13.

At 1825, the base station may transmit a set of transmission beams, including the second beam, for measurement by the UE. The operations of 1825 may be performed according to the methods described herein. In some examples, aspects of the operations of 1825 may be performed by a beam sweep manager as described with reference to FIGS. 10 through 13.

At 1830, the base station may receive, from the UE, measurement information associated with the set of transmission beams. The operations of 1830 may be performed according to the methods described herein. In some examples, aspects of the operations of 1830 may be performed by a reference signal manager as described with reference to FIGS. 10 through 13.

At 1835, the base station may determine to switch the UE from the first transmission beam to the second beam based on the measurement information. The operations of 1835 may be performed according to the methods described herein. In some examples, aspects of the operations of 1835 may be performed by a beam transmission component as described with reference to FIGS. 10 through 13.

At 1840, the base station may transmit a beam switch command to the UE to switch from the first transmission beam to the second beam. The operations of 1840 may be performed according to the methods described herein. In some examples, aspects of the operations of 1840 may be performed by a beam transmission component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a downlink data transmission from an access network entity in a first transmission beam;
   determining, based at least in part on a signal quality of the first transmission beam satisfying a threshold, to transmit a beam training request to the access network entity to identify a second transmission beam for communications between the UE and the access network entity;
   scrambling, using a scrambling sequence, uplink control information to be transmitted to the access network entity in uplink resources, wherein the scrambling sequence is selected to indicate the beam training request to the access network entity; and
   transmitting the uplink control information to the access network entity using the uplink resources.

2. The method of claim 1, wherein the uplink control information includes one or more of hybrid automatic repeat request (HARQ) acknowledgment/negative-acknowledgment (ACK/NACK) information, a scheduling request (SR), a reference signal transmission, a reference signal quality indication, a reference signal index indication, or any combinations thereof.

3. The method of claim 2, wherein the reference signal quality indication provides one or more of reference signal received power (RSRP), reference signal received quality (RSRQ), signal-to-noise ratio (SNR), signal-to-interference-and-noise ratio (SINR), or any combinations thereof.

4. The method of claim 2, wherein a reference signal associated with the reference signal transmission, the reference signal quality indication, the reference signal index indication, or a combination thereof includes one or more of a synchronization signal, a demodulation reference signal (DMRS), channel state information reference signal (CSI-RS), or any combinations thereof.

5. The method of claim 1, wherein the uplink control information is a hybrid automatic repeat request (HARQ) acknowledgment/negative-acknowledgment (ACK/NACK) transmission and comprises a combined uplink control information sequence selected from a plurality of available sequences for the HARQ ACK/NACK transmission, wherein the plurality of available sequences includes one or more of an ACK-only sequence, a NACK-only sequence, a beam training request only sequence, or a sequence that indicates a combination of one or more of ACK, NACK, or beam training request information.

6. The method of claim 5, wherein the combined uplink control information sequence includes a first portion that includes ACK/NACK bits and a second portion that includes beam training request bits.

7. The method of claim 5, further comprising:
   receiving, from the access network entity, configuration information for the combined uplink control information sequence in one or more of a physical downlink control channel (PDCCH), a medium access control (MAC) control element (MAC-CE), radio resource control (RRC) signaling, system information (SI) signaling, a master information block, or any combinations thereof.

8. The method of claim 1, further comprising:
   receiving a beam training indication from the access network entity that initiates a beam training procedure;
   monitoring one or more transmission beams from the access network entity, including the second transmission beam;
   transmitting measurement information associated with the monitored one or more transmission beams to the access network entity; and
   receiving a beam switch command from the access network entity to switch from the first transmission beam to the second transmission beam responsive to the measurement information.

9. An apparatus for wireless communication at a user equipment (UE), comprising:
   a processor, memory in electronic communication with the processor; and
   instructions stored in the memory and executable by the processor to cause the apparatus to:
      receive a downlink data transmission from an access network entity in a first transmission beam;
      determine, based at least in part on a signal quality of the first transmission beam satisfying a threshold, to transmit a beam training request to the access network entity to identify a second transmission beam for communications between the UE and the access network entity;
      scramble, using a scrambling sequence, uplink control information to be transmitted to the access network entity in uplink resources, wherein the scrambling sequence is selected to indicate the beam training request to the access network entity; and transmitting the uplink control information to the access network entity using the uplink resources.

10. The apparatus of claim 9, wherein the uplink control information includes one or more of hybrid automatic repeat request (HARQ) acknowledgment/negative-acknowledgment (ACK/NACK) information, a scheduling request (SR), a reference signal transmission, a reference signal quality indication, a reference signal index indication, or any combinations thereof.

11. The apparatus of claim 10, wherein the reference signal quality indication provides one or more of reference signal received power (RSRP), reference signal received quality (RSRQ), signal-to-noise ratio (SNR), signal-to-interference-and-noise ratio (SINK), or any combinations thereof.

12. The method of claim 1, further comprising:

identifying a combined uplink control information sequence that combines the beam training request with the uplink control information to be transmitted to the access network entity; and transmitting the combined uplink control information sequence to the access network entity.

13. The apparatus of claim 9, wherein the instructions are further executable by the processor to cause the apparatus to:

identify a combined uplink control information sequence that combines the beam training request with the uplink control information to be transmitted to the access network entity; and transmit the combined uplink control information sequence to the access network entity.

\* \* \* \* \*